(12) United States Patent
Isbiliroglu et al.

(10) Patent No.: US 10,893,332 B2
(45) Date of Patent: Jan. 12, 2021

(54) USER-INITIATED TRANSITIONING BETWEEN MEDIA CONTENT VERSIONS

(71) Applicant: OpenTV, Inc., San Francisco, CA (US)

(72) Inventors: Mehmet Hakan Isbiliroglu, San Jose, CA (US); Rohan Pingali, San Jose, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 16/409,058

(22) Filed: May 10, 2019

(65) Prior Publication Data

US 2020/0037030 A1 Jan. 30, 2020

Related U.S. Application Data

(63) Continuation of application No. 15/466,438, filed on Mar. 22, 2017, now Pat. No. 10,349,136.

(51) Int. Cl.
*H04N 21/4627* (2011.01)
*H04N 21/84* (2011.01)
(Continued)

(52) U.S. Cl.
CPC ... *H04N 21/4627* (2013.01); *H04N 21/23439* (2013.01); *H04N 21/2541* (2013.01);
(Continued)

(58) Field of Classification Search
CPC ......... H04N 21/4627; H04N 21/23439; H04N 21/2541; H04N 21/44016; H04N 21/454;
(Continued)

(56) References Cited

U.S. PATENT DOCUMENTS 6,889,383 B1 5/2005 Jarman
6,898,799 B1 5/2005 Jarman
(Continued)

OTHER PUBLICATIONS

"U.S. Appl. No. 15/466,438, 312 Amendment filed Apr. 13, 2019", 10 pgs.

(Continued)

*Primary Examiner* — Pankaj Kumar
*Assistant Examiner* — Alexander Boyd
(74) *Attorney, Agent, or Firm* — Schwegman Lundberg & Woessner, P.A.

(57) ABSTRACT

Example embodiments facilitate user-initiated transitioning between versions of media content. In an example embodiment, a content access device receives a first version of a plurality of versions of a media content item via a communication network from a media content source, and causes presentation of the first version via a display device. During the receiving of the first version, the media content device receives a first request for a second version of the media content item. In response to the first request, the content access device transmits a second request to the media content source to begin receiving the second version. After the transmitting of the second request, the content access device receives the second version for display beginning at a point in the second version related to a point in the first version last received from the media content source.

20 Claims, 15 Drawing Sheets

(51) Int. Cl.

| | | |
|---|---|---|
| *H04N 21/658* | (2011.01) | |
| *H04N 21/44* | (2011.01) | |
| *H04N 21/6547* | (2011.01) | |
| *H04N 21/488* | (2011.01) | |
| *H04N 21/2343* | (2011.01) | |
| *H04N 21/254* | (2011.01) | |
| *H04N 21/454* | (2011.01) | |
| *H04N 21/845* | (2011.01) | |

(52) U.S. Cl.
CPC ..... *H04N 21/44016* (2013.01); *H04N 21/454* (2013.01); *H04N 21/4884* (2013.01); *H04N 21/6547* (2013.01); *H04N 21/6581* (2013.01); *H04N 21/84* (2013.01); *H04N 21/8456* (2013.01)

(58) Field of Classification Search
CPC .......... H04N 21/4884; H04N 21/6547; H04N 21/6581; H04N 21/84; H04N 21/8456
See application file for complete search history.

(56) References Cited

U.S. PATENT DOCUMENTS

| | | | |
|---|---|---|---|
| 7,526,784 | B2 | 4/2009 | Jarman |
| 7,543,318 | B2 | 6/2009 | Jarman |
| 7,577,970 | B2 | 8/2009 | Jarman |
| 7,975,021 | B2 | 7/2011 | Jarman et al. |
| 8,117,282 | B2 | 2/2012 | Jarman et al. |
| 8,145,037 | B2 | 3/2012 | Kozuka et al. |
| 8,793,721 | B1 | 7/2014 | Sharkey et al. |
| 8,819,263 | B2 | 8/2014 | Jarman et al. |
| 8,850,469 | B1 | 9/2014 | Yang |
| 8,861,939 | B2 | 10/2014 | Jarman |
| 8,935,717 | B2 | 1/2015 | Jarman |
| 9,015,571 | B2 | 4/2015 | Jarman et al. |
| 9,066,046 | B2 | 6/2015 | Jarman et al. |
| 9,392,245 | B2 | 7/2016 | Jarman et al. |
| 9,451,324 | B2 | 9/2016 | Jarman et al. |
| 10,349,136 | B2 | 7/2019 | Isbiliroglu et al. |
| 2004/0190871 | A1 | 9/2004 | Seo et al. |
| 2006/0177198 | A1 | 8/2006 | Jarman et al. |
| 2006/0236220 | A1 | 10/2006 | Jarman |
| 2007/0168853 | A1 | 7/2007 | Jarman |
| 2007/0186235 | A1 | 8/2007 | Jarman et al. |
| 2007/0186236 | A1 | 8/2007 | Jarman |
| 2007/0288516 | A1 | 12/2007 | Jarman |
| 2009/0204404 | A1 | 8/2009 | Jarman et al. |
| 2009/0210897 | A9 | 8/2009 | Jarman et al. |
| 2009/0249176 | A1 | 10/2009 | Jarman |
| 2010/0195990 | A1 | 8/2010 | Jarman |
| 2010/0218214 | A1 | 8/2010 | Fan et al. |
| 2010/0235472 | A1 | 9/2010 | Sood et al. |
| 2011/0030006 | A1 | 2/2011 | Noh et al. |
| 2011/0246621 | A1 | 10/2011 | May, Jr. et al. |
| 2012/0005034 | A1 | 1/2012 | Jarman et al. |
| 2012/0207446 | A1 | 8/2012 | Jarman et al. |
| 2012/0254457 | A1 | 10/2012 | Condon et al. |
| 2013/0212231 | A1* | 8/2013 | Shi ................... H04N 21/23424 709/219 |
| 2014/0189727 | A1 | 7/2014 | Chen et al. |
| 2015/0019968 | A1 | 1/2015 | Roberts et al. |
| 2015/0030315 | A1 | 1/2015 | Jarman |
| 2015/0043894 | A1 | 2/2015 | Jarman et al. |
| 2015/0128166 | A1 | 5/2015 | Jarman |
| 2015/0229689 | A1 | 8/2015 | Jarman et al. |
| 2016/0029084 | A1 | 1/2016 | Jarman et al. |
| 2016/0057462 | A1* | 2/2016 | Mitchell .......... H04N 21/23439 725/35 |
| 2016/0323644 | A1 | 11/2016 | Jarman et al. |
| 2017/0280181 | A1 | 9/2017 | Ramaley |
| 2018/0279001 | A1 | 9/2018 | Isbiliroglu et al. |

OTHER PUBLICATIONS

"U.S. Appl. No. 15/466,438, Examiner Interview Summary dated Jan. 28, 2019", 3 pgs.

"U.S. Appl. No. 15/466,438, Examiner Interview Summary dated Jul. 5, 2018", 3 pgs.

"U.S. Appl. No. 15/466,438, Final Office Action dated Oct. 19, 2018", 18 pgs.

"U.S. Appl. No. 15/466,438, Non Final Office Action dated Mar. 2, 2018", 18 pgs.

"U.S. Appl. No. 15/466,438, Notice of Allowance dated Feb. 11, 2019", 5 pgs.

"U.S. Appl. No. 15/466,438, PTO Response to Rule 312 Communication dated May 16, 2019", 2 pgs.

"U.S. Appl. No. 15/466,438, Response filed Jan. 21, 2019 to Final Office Action dated Oct. 19, 2018", 12 pgs.

"U.S. Appl. No. 15/466,438, Response filed Jun. 29, 2018 to Non Final Office Action dated Mar. 2, 2018", 14 pgs.

* cited by examiner

USER-INITIATED TRANSITIONING BETWEEN MEDIA CONTENT VERSIONS

CLAIM OF PRIORITY

This application is a continuation of U.S. patent application Ser. No. 15/466,438, filed on Mar. 22, 2017, which is incorporated herein by reference in its entirety.

FIELD

The present disclosure relates generally to presentation of media content and, in a specific example embodiment, to user-initiated transitioning between versions of media content.

BACKGROUND

While child-appropriate media content, such as cartoons, children's television shows, animated movies featuring talking animals, and the like, often serve as a basis for much-appreciated family time, many parents, at times, may desire consuming more mature entertainment not appropriate for younger viewers or listeners. While the parents may safely engage in the latter viewing habits when the younger inhabitants of the household are not present, such opportunities are typically few and far between. In the alternative, the parents may attempt to view more mature content while the children are not in the same room, but unexpected interruptions by the younger denizens of the home typically result in the parent being forced to pause or stop the media content being consumed until the intrusion is resolved.

BRIEF DESCRIPTION OF DRAWINGS

Various ones of the appended drawings merely illustrate example embodiments of the present disclosure and cannot be considered as limiting in scope.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
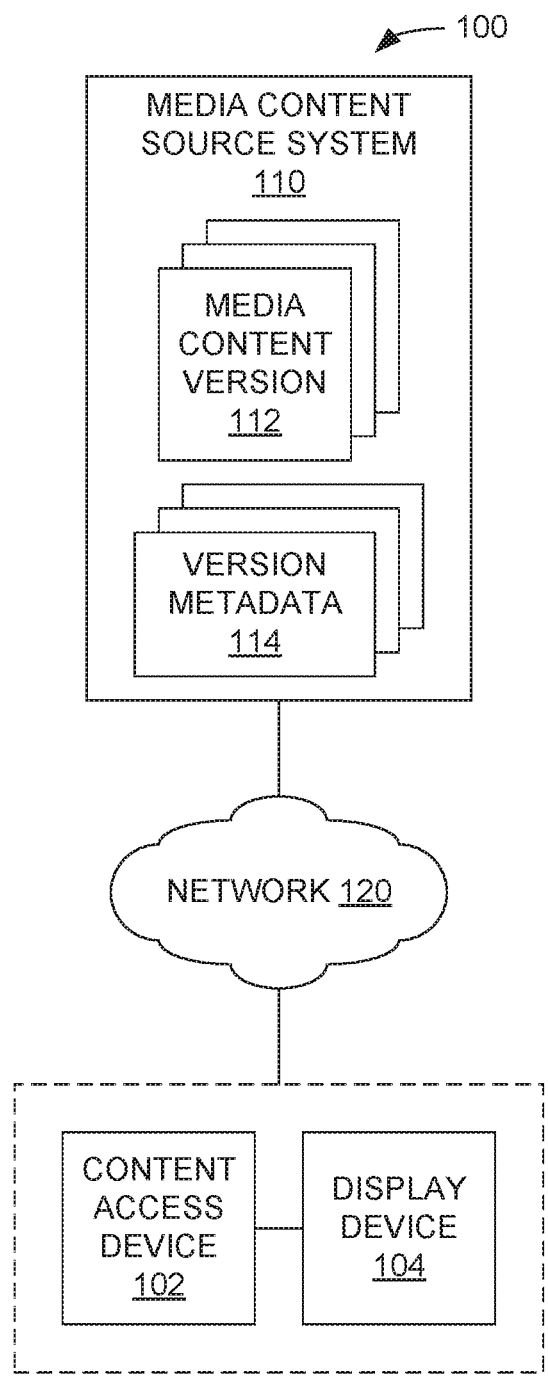
FIG. 1 is a block diagram of an example media content distribution system.
Figure 4A:
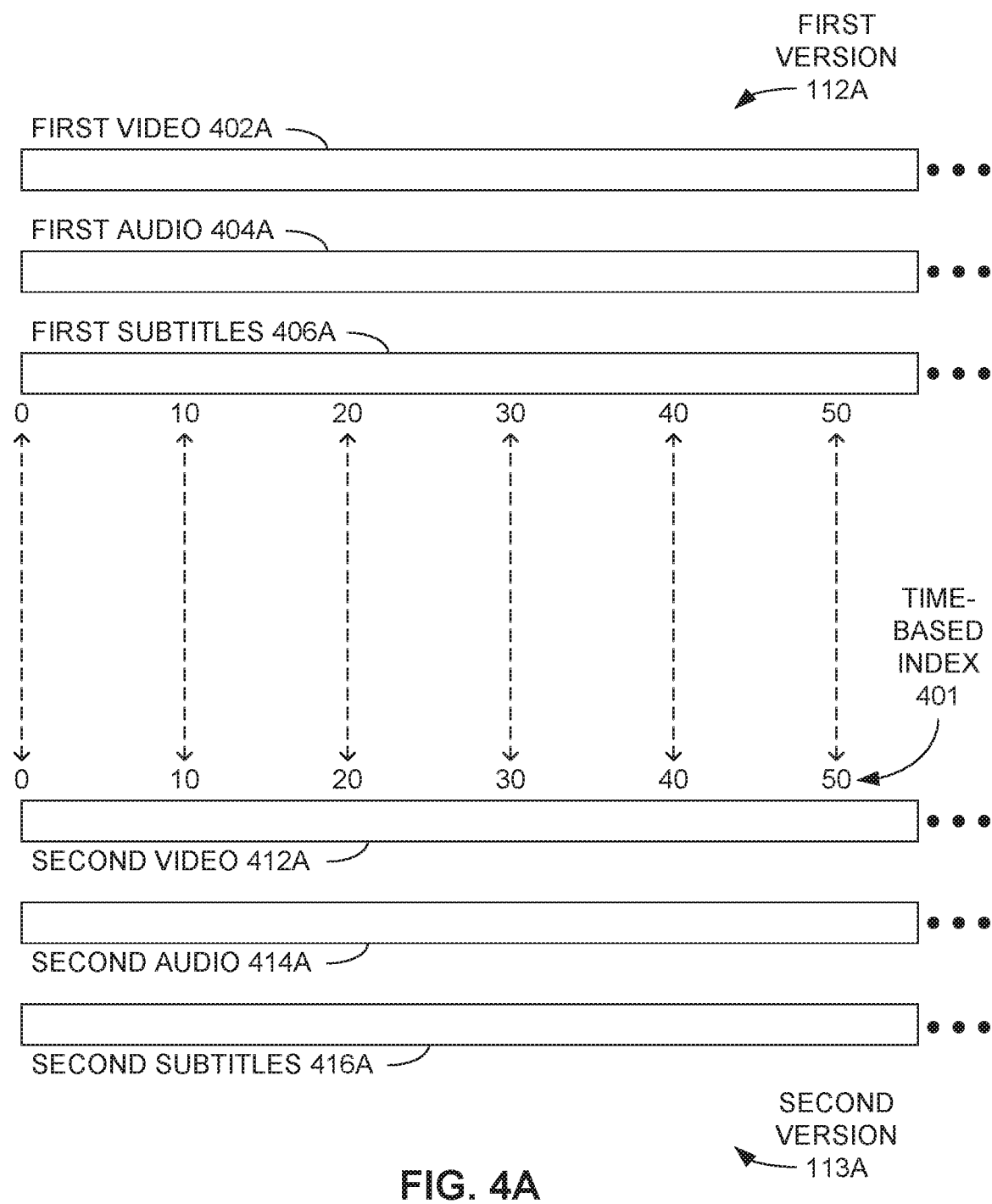
FIG. 4A is a timing diagram relating two versions of a media content item in which the second version is a full-length alternate version of the first version.
Figure 4B:
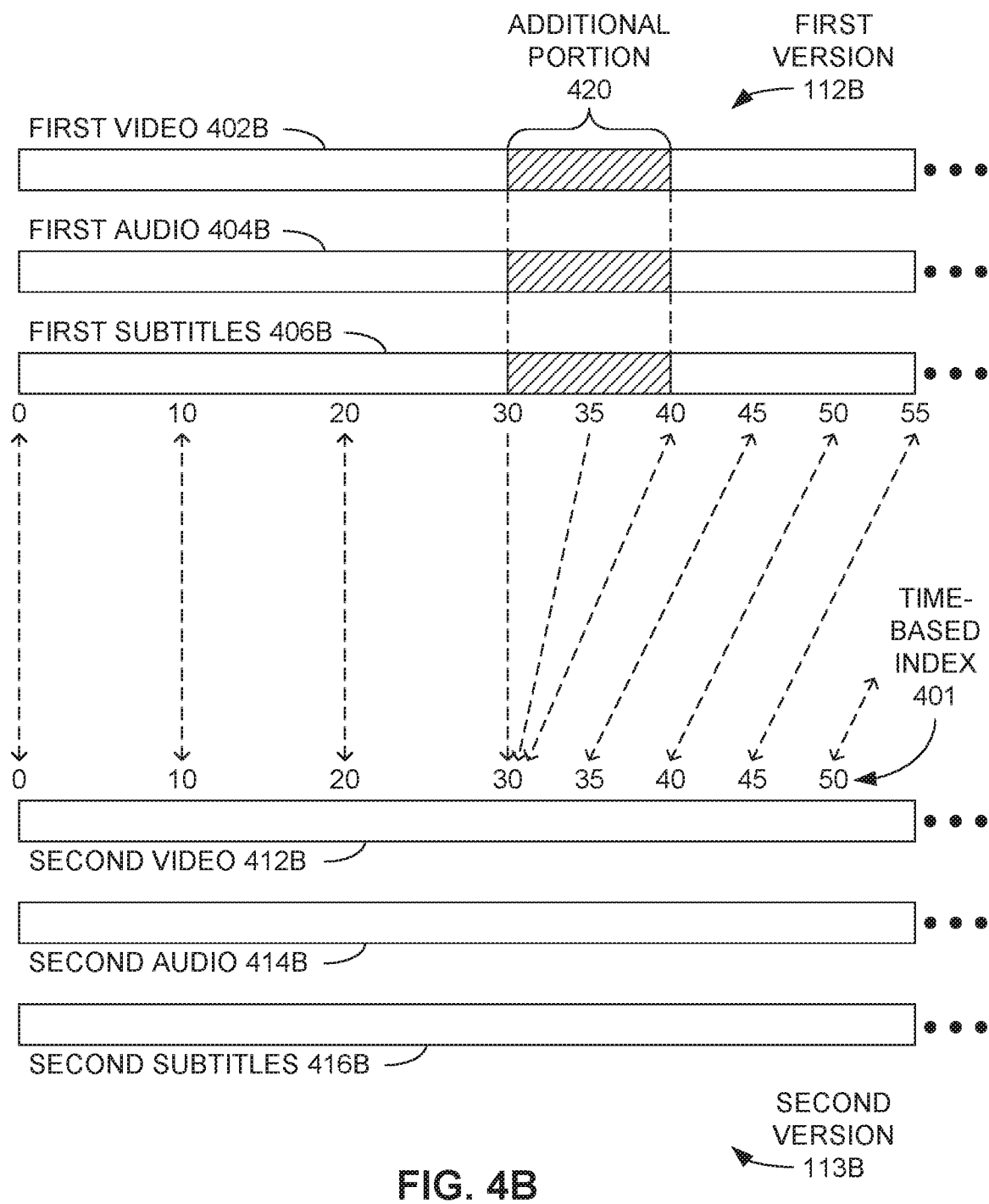
FIG. 4B is a timing diagram relating two versions of a media content item in which the second version is a redacted or time-shortened version of the first version.
Figure 5A:
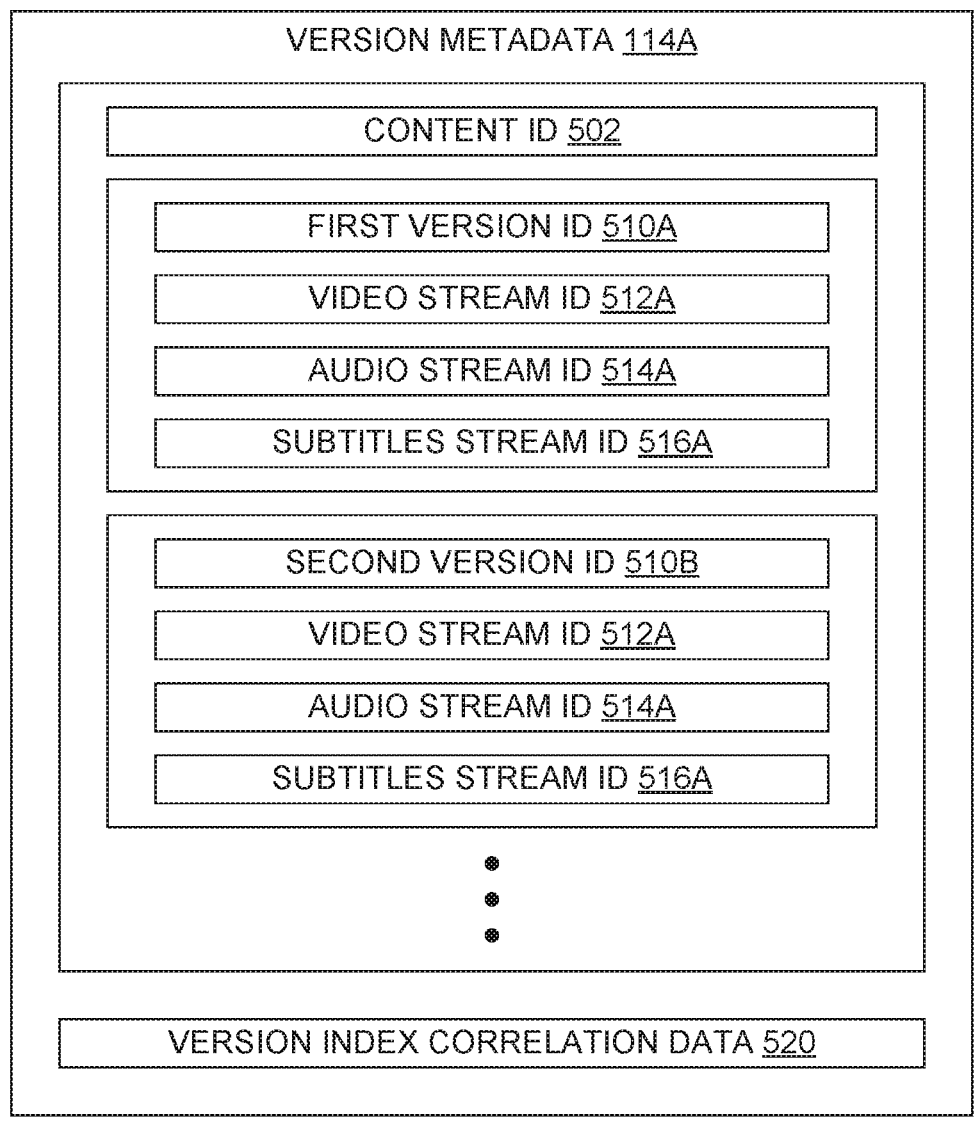
FIG. 5A is a block diagram of a first type of example version metadata employable in the media content source system of FIG. 2.
Figure 5B:
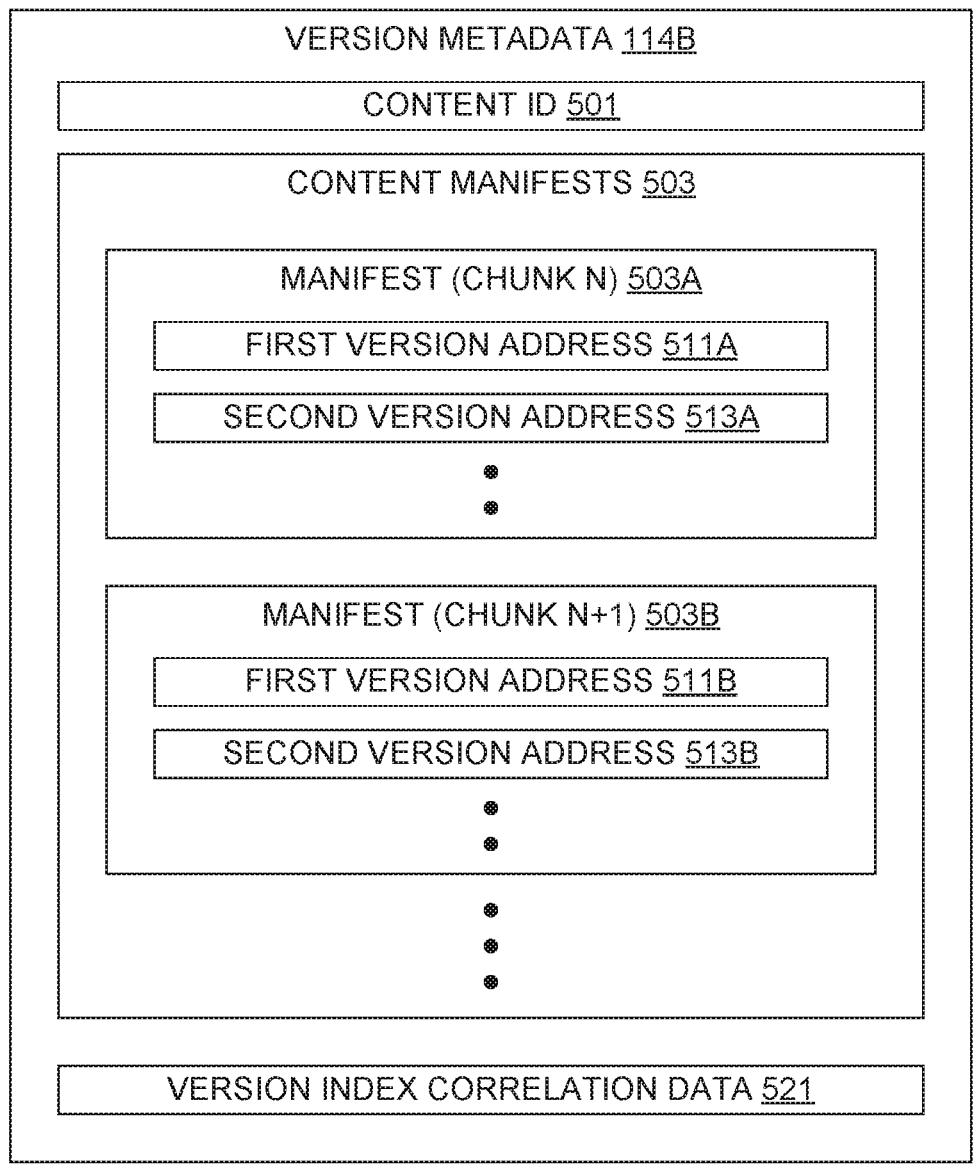
FIG. 5B is a block diagram of a second type of example version metadata employable in the media content source system of FIG. 2.

FIG. 1 is a block diagram of an example media content distribution system 100 that may facilitate user-initiated, "on-the-fly" (e.g., during reception) switching between versions of a media content item (e.g., movie, television episode, sporting event, and so on) accessed by a content access device 102 from a media content source system 110 via a communication network 120 and presented via a display device 104. As shown, the media content source system 110 may store, or maintain access to, multiple media content versions 112 of a media content item, along with version metadata 114 associated with the multiple versions 112. More specifically, the version metadata 114 may identify the various versions 112 of the media content item, and may interrelate portions of the various versions 112 to facilitate switching between those versions. FIGS. 4A and 4B graphically depict example embodiments of the media content versions 112, and FIGS. 5A and 5B illustrate example embodiments of the version metadata 114.

Examples of the communication network 120 may include, but are not limited to, a wide-area network (WAN) (e.g., the Internet), a local area network (LAN), a cellular network (e.g., third-generation (3G) or fourth-generation (4G) network), a cable television network, a satellite television network, a terrestrial television network, or any other communication network or connection, or combinations thereof. While FIG. 1 depicts a single content access device 102 and associated display device 104, as well as a single media content source system 110, multiple instances of such systems 110 and devices 102, 104 may be employed in other example embodiments.

The media content source system 110 may be configured to deliver one or more versions 112 of media content items (e.g., movies, television episodes, sporting events, news programs, music concerts, various video and/or video clips, and so on) to one or more content access devices 102 via the communication network 120 for presentation to a user or viewer on the display device 104. While the media content source system 110, in some example embodiments, may deliver both live and recorded media content via the communication network 120, example embodiments discussed herein focus primarily on previously recorded or generated content that may be presented in multiple versions 112. Such versions 112 may include versions in different languages (e.g., affecting the audio and/or subtitle tracks), versions with different or removed scenes (e.g., to adhere to decency standards), versions of different running times, and so on. Examples of the media content source system 110 may include, but are not limited to, broadcast cable and satellite television systems, video-on-demand (VOD) content delivery systems, Internet Protocol Television (IPTV) content delivery systems, over-the-top (OTT) content delivery systems, and others. In some example embodiments, the media content source system 110 may be employed as a server system in conjunction with the one or more content access devices 102, which may operate as client systems in such cases.

In an example embodiment, the display device 104 may be any display or presentation device configured to display or present a version of an item of media content (e.g., video content, audio content, and/or the like) to a user, listener, or viewer. Consequently, the content access device 102 and the display device 104 may constitute a number of different configurations in various example embodiments. In an example embodiment, the content access device 102 and the display device 104 may be separate, but communicatively intercoupled, devices. For instance, the display device 104 may be a television or video monitor, while the content access device 102 may be a television set-top box, video streaming device, gaming system, or the like. Consequently, in such example embodiments, a user or viewer may communicate with the content access device 102 via a remote control device, such as a remote control designed specifically for use with the content access device 102, a "universal" remote control, a smart phone, or a tablet computer. In yet other example embodiments, the content access device 102 and the display device 104 may be combined as a single unit, including, but not limited to, a smart television, desktop computer, laptop computer, tablet computer, smartphone, or the like. Other configurations for the content access device 102 and the display device 104 are also possible.

In at least some example embodiments described in greater detail below, the content access device 102 may be configured to receive a first version 112 of a media content item from the media content source system 110 and present the first version 112 to a user via the display device 104. While the first version 112 is being presented, the content access device 102 may receive a request (e.g., via a remote control device, via remote voice input, and so on) to switch from the current (first) version 112 to a second version 112 of the same media content item. For example, the first version 112 may be an original version 112 (e.g., rated "R") of a movie, and the second version may be a modified version 112. (e.g., rated "PG"), with the user requesting the switch, possibly in response to a change of circumstances in the area in which the first version 112 is being viewed, such as the entrance of a child into the area. In response to the request, the content access device 102 may transmit a related request via the network 120 to the media content source system 110. In response to that related request, in an example embodiment, the media content source system 110 may begin transmitting the second version 112 instead of the first version 112, possibly to facilitate a "seamless" switch (e.g., without a gap in presentation between the two versions) between the two versions 112. In another example embodiment, in response to the request received at the content access device 102, the content access device 102 may retrieve, receive, or tune to the second version 112 being provided via the media content source system 110 without having to request explicitly that particular version 112 from the media content source system 110. This particular capability may be provided by way of the content access device 102 accessing or receiving information that facilitates the switching of versions 112 at the content access device 102. While these particular scenarios involve the preventing of a child from seeing or hearing content that is age-inappropriate, the capability of version-switching discussed hereafter may be applied to many other environments and scenarios not specifically mentioned herein. Example embodiments of the media content source system 110 are discussed below in connection with FIG. 2, while example embodiments of the content access device 102 are covered in greater detail below in conjunction with FIG. 3.

Figure 2:
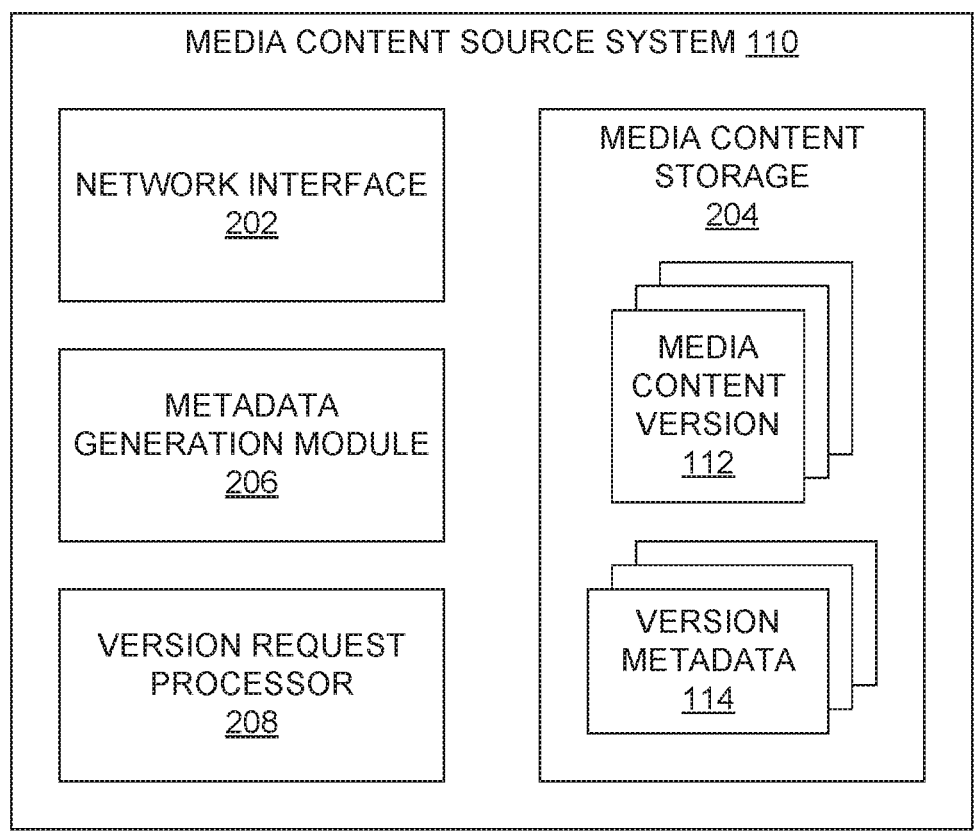
FIG. 2 is a block diagram of an example media content source system of the media content distribution system of FIG. 1.

FIG. 2 is a block diagram of an example embodiment of the media content source system 110 of the media content distribution system 100 of FIG. 1. As depicted in FIG. 2, in addition to media content storage 204 storing the media content versions 112 and associated version metadata 114 of one or more media content items, as mentioned above, the media content source system 110 may also include one or more of a network interface 202, a metadata generation module 206, and a version request processor 208. In example embodiments, the various modules 202-208 of the media content source system 110 may be implemented in hardware (e.g., logic circuits and other electronic components), in software or firmware in the form of instructions stored in a memory and configured to be executed on one or more hardware processors (e.g., microprocessors, microcontrollers, and the like), or some combination thereof. Also in some example embodiments, fewer than all of the modules 202-208 may be implemented in the media content source system 110, and additional modules other than those explicitly depicted in FIG. 2 may be employed therein.

The network interface 202 may be configured to transmit one or more media content versions 112, as well as related information (e.g., version 112 identifiers, time-based indexes, and other version metadata 114) to the content access device 102, as well as to receive requests from the content access device 102 to switch from one version 112 to another, as well as to facilitate other communications between the media content source system 110 and the content access device 102. In an example embodiment, the network interface 202 may include one or more of a WAN (e.g., Internet) interface, an Ethernet local area network (LAN) interface, a wireless LAN (e.g., WiFi®, Bluetooth®, and so on) interface, a wireless cellular (e.g., Long-Term Evolution (LTE®)) interface, a satellite broadcast interface, a cable broadcast interface, a terrestrial broadcast interface, and so on.

In an example embodiment, the media content storage 204 may store the media content versions 112 and the version metadata 114 associated with those versions 112 for one or more media content items. Examples of the media content storage 204 may include, but are not limited to, magnetic disk storage, optical disk storage, flash memory storage, and so on. While the media content storage 204 is depicted in FIG. 2 as residing within the media content source system 110, in other example embodiments, the media content storage 204 may be located external to the media content source system 110 and accessed by the media content source system 110 via the network interface 202 and the communication network 120. For example, the media content storage 204 may include a content delivery network (CDN) that is accessible by the media content source system 110 and that stores the various media content versions 112, possibly along with version metadata 114 for one or more of those versions 112. Consequently, the content access device 102, in some example embodiments, may retrieve the media content versions 112 directly from the CDN, or from the CDN via the media content source system 110.

In an example embodiment, the metadata generation module 206 may be configured to generate or access the version metadata 114 for each of the media content versions 112 of a media content item. In various example embodiments discussed below, the version metadata 114 may include metadata identifying the media content item, each version 112 of that item, and one or more data streams (e.g., video stream, audio stream, subtitle or closed captioning stream, and so forth) of each version 112. In some example embodiments, the version metadata 114 may include address data to inform the content access device 102 where each version 112, or individual portions or "chunks" thereof, may be retrieved via the communication network 120. Also, the version metadata 114 may include information relating or correlating one or more points in time (e.g., via time-based indexes) of one version 112 to another, as such information may aid the media content source system 110 and/or the content access device 102 in switching from one media content version 112 to another in as logical or non-intrusive a manner as possible. Example embodiments of the version metadata 114 are discussed below in conjunction with FIGS. 5A and 5B.

The version request processor 208, in an example embodiment, may be configured to receive one or more version-switching requests from the content access device 102 and, in response, replace the media content item version 112 currently being transmitted to the content access device 102. In an example embodiment, the version request processor 208 may determine at what point within the new version 112 transmission is to begin based on a point at which the transmission of the current version 112 has, or is to be, ended. In some example embodiments, these points are associated with time-based indexes associated with the versions 112, as well as metadata that correlates the time-based indexes of the versions 112.

Figure 3:
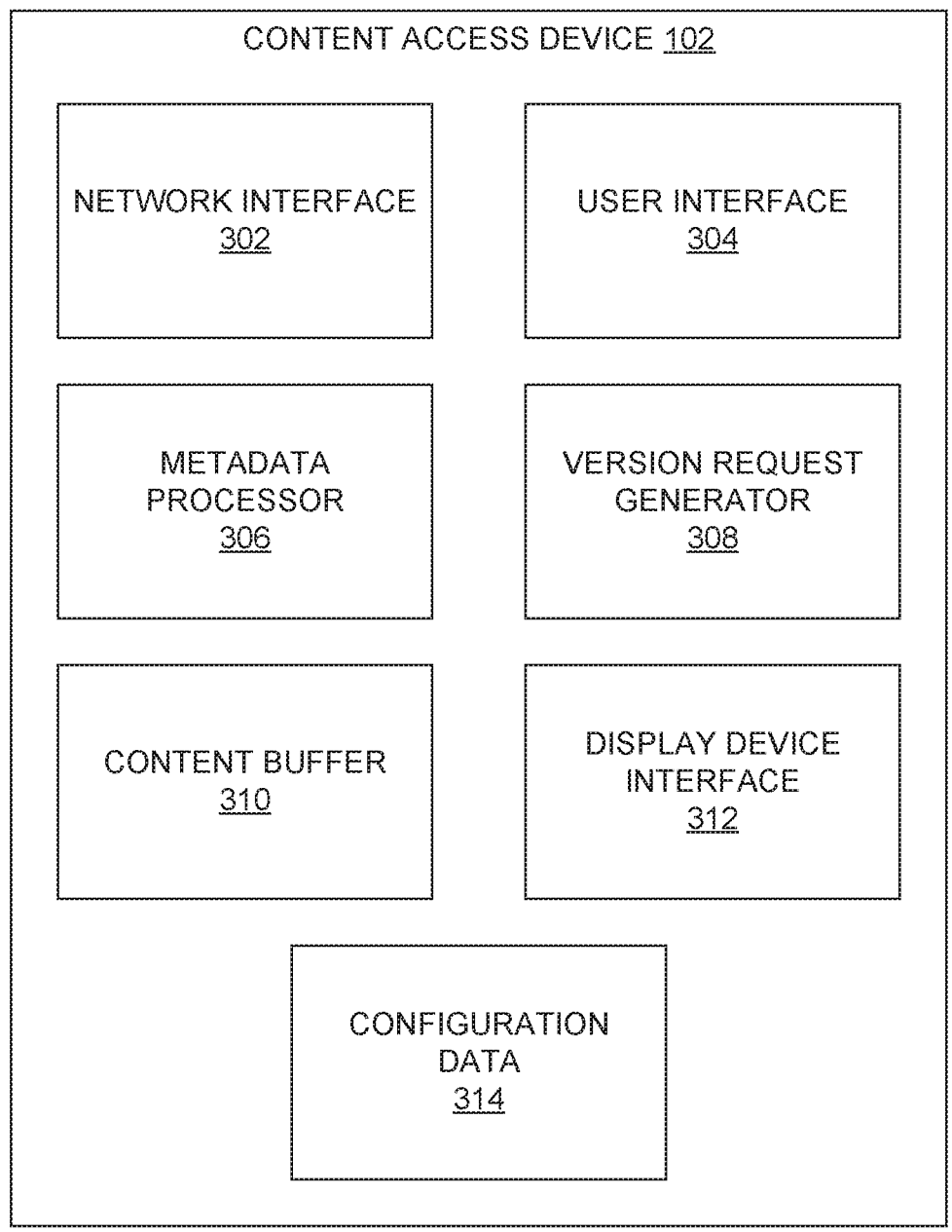
FIG. 3 is a block diagram of an example content access device of the media content distribution system of FIG. 1.

FIG. 3 is a block diagram of an example of the content access device 102 of the media content distribution system 100 of FIG. 1. As shown in FIG. 3, the content access device 102 may include a network interface 302, a user interface 304, a metadata processor 306, a version request generator 308, a content buffer 310, a display device interface 312, and configuration data 314. In example embodiments, the various modules 302-314 of the content access device 102 may be implemented in hardware (e.g., logic circuits and other electronic components), in software or firmware in the form of instructions stored in a memory and configured to be executed on one or more hardware processors (e.g., microprocessors, microcontrollers, and the like), or some combination thereof. Also in some example embodiments, fewer than all of the modules 302-314 may be implemented, and additional modules other than those explicitly depicted in FIG. 3 may be employed.

In an example embodiment, the network interface 302 may be configured in a manner similar to the network interface 202 of the media content source system 110 of FIG. 2. More specifically, the network interface 302 may be configured to access the media content source system 110 via the network interface 202 and the communication network 120, such as to receive media content versions 112 and associated version metadata 114, as well as to transmit requests to switch from one version 112 to another.

The user interface 304 may be configured to receive input for, and provide output from, the content access device 102. For example, the user interface 304 may receive a request from a user (e.g., viewer or listener) to switch from one media content version 112 currently being presented via the display device 104 to another. In some example embodiments, such a request may include an indication of a particular new version 112 the user wishes to view. In some example embodiments, the user interface 304 may also receive input from a user to select a particular media content item for presentation prior to any requests for switching between one version 112 of the media content item to another, such as by way of a menu, electronic program guide, or other means. Also in example embodiments, the user interface 304, such as by way of the display device 104 (and, thus, the display device interface 312), may provide an indication (e.g., a visual icon) indicating which version 112 of a media content item is currently being presented. Such an indication may be helpful in circumstances in which the identity of the version 112 currently being presented is not obvious to the user. Example embodiments of the user interface 304 may include, but are not limited to, a keyboard, mouse, touchscreen, camera (e.g., for physical gesture input), microphone (e.g., for voice input), speakers, remote control device (e.g., for wired or wireless input (e.g., via infrared (IR), radio frequency (RF), Bluetooth®, WiFi®, or other signals)), and so on.

In an example embodiment, the metadata processor 306 may be configured to process the version metadata 114 associated with one or more versions 112 of the media content item being received. This processing may facilitate the parsing or interpreting of the metadata 114 so that the version 112 of the media content item being received may be presented via the display device 104 to the user, as well as facilitate the continued reception of the current version 112, and/or the reception of a new version 112. In addition, the metadata processor 306, in processing the received version metadata 114, may generate information regarding other versions 112 of the media content item being received that may be presented to the user to aid the user in selecting another version 112 for presentation via the display device 104.

The version request generator 308, in an example embodiment, may generate a request to be transmitted via the network interface 302 and the network 120 to the media content source system 110 to switch from a version 112 of the media content item currently being received to another version 112 of the same media content item. In an example embodiment, the version request generator 308 may generate such a request in response to a request received via the user interface 304 (e.g., via a button press, screen touch, gesture input, or voice input of a remote control device). In other example embodiments, the version request generator 308 may receive input other than explicit user input (e.g., motion detection input, ambient audio input, radio-frequency identification (RFID) input (such as from a cellphone or other device indicating the presence of a person), and so on) that causes the version request generator 308 to generate the version-switching request to the media content source system 110.

Some example embodiments of the content access device 102 may also include a content buffer 310 to temporarily store at least a portion of the received version 112 of the media content item being received. In one example, use of the content buffer 310 may facilitate the storing of a portion of the version 112 while a previous portion of the version 112 is being processed for presentation via the display device interface 312. Additionally, buffering a portion of the version 112 as it is being received may facilitate continuous presentation of a current or new version 112 of the media content item during times when the transmission of the version 112 from the media content source system 110 to the content access device 102 is temporarily interrupted, or is intermittent in nature.

In an example embodiment, the display device interface 312 may be configured to deliver, to the display device 104, the media content version 112 currently being received via the network interface 302. The display device interface 312 may include, for example, a High-Definition Multimedia Interface (HDMI), component video connection, composite video connection, coaxial cable video connection, or the like. In some example embodiments, the display device interface 312 may be wired, wireless (e.g., via WiFi® or Bluetooth®), or some combination thereof.

The configuration data 314, in an example embodiment, may include data that indicates user preferences or related information impacting the processing of explicit and/or implicit version-switching requests (e.g., requests received via the user interface 304 or other means the presentation of the version 112 being received, the possible presentation of an indicator signifying which version 112 is currently being presented, and so on. More specific example embodiments of the configuration data 314 are discussed in greater detail with respect to FIG. 12 below.

FIG. 4A is a timing diagram relating two versions 112A, 113A of an example media content item in which the second version 113A is a full-length alternate version of the first version 112A. As depicted in FIG. 4A, the first version 112A includes data for first video 402A, first audio 404A, and first subtitles 406A, while the second version 113A includes data for second video 412A, second audio 414A, and second subtitles 416A. While only two versions 112A, 113A are depicted in FIG. 4A, a greater number of versions 112 may be available for the media content item, such as versions having multiple audio tracks of different languages.

Also included with each version 112A, 113A is timing information relating points within the first version 112A to corresponding points within the second version 113A. In this particular example embodiment, the timing information includes time-based indexes 401 associated with each of the versions 112A, 113A. In some example embodiments, a time-based index 401 may be associated with each individual frame or other individual element of the video, audio, or other segment of a version 112A, 113A. In other example embodiments, fewer than all of the individual frames or elements of the version 112A, 113A (e.g., the I-frame of each group-of-pictures (GOP) of the video 402A, 412A of a version 112A, 113A) may be associated with a corresponding time-based index 401. The time-based indexes 401 may be actual time values, counting values that increase monotonically for each frame or element, or some other type of value.

In an example embodiment, also included in the timing information is information relating the two sets of time-based indexes 401, represented in FIG. 4A by dashed arrows connecting corresponding time-based indexes 401 of the two versions 112A, 113A. In some example embodiments, each time-based index 401 of one version 112A, 113A may be specifically associated with a corresponding time-based index 401. In other example embodiments, the timing information may specify only some associations between corresponding time-based indexes 401, presuming that the various points of the versions 112A, 113A between those corresponding time-based indexes 401 are related in a linear fashion. In yet other example embodiments, one or more formulas, equations, or the like may specify the correspondence between the time-based indexes 401 of the first version 112A and the time-based indexes 401 of the second version 113A.

In an example embodiment, the timing information of FIG. 4A facilitates the switching from the first version 112A to the second version 113A, as well as switching from the second version 113A to the first version 112A, at any point in the presentation of the media content item. For example, a switch from the first version 112A to the second version 113A at the time-based index 401 of 10 would result in the first version 112A being played up to the index 401 of 10, immediately followed by the playing of the second version 113A starting at its index 401 of 10.

In the particular example of FIG. 4A, a unique one-to-one correspondence between time-based indexes 401 of the two versions 112A, 113A exists, in that each separate time-based index 401 of the first version 112A corresponds with a unique time-based index of the second version 113A, indicating that that portion of the first version 112A is associated with a corresponding portion of the second version 112A. In example embodiments, this type of correspondence between two versions 112A, 113A does not necessarily indicate that the content of the two versions 112A, 113A are identical throughout, but may instead include alternate content, such as different languages for dialogue, or different camera angles of a live sporting event, musical concert, or the like.

FIG. 4B is a timing diagram relating two versions 112B, 113B of a media content item in which the second version 113B is a redacted or time-shortened version of the first version 113A. Similar to the example embodiment of FIG. 4A, the first version 112B includes data for first video 402B, first audio 404B, and first subtitles 406B, while the second version 113B includes data for second video 412B, second audio 414B, and second subtitles 416B. Also included is timing information including time-based indexes 401 for the first version 112B and the second version 113B, and information showing a correspondence between the time-based indexes 401 of the two versions 112B, 113B.

In the particular example of FIG. 4B, an additional portion 420 is present in the first version 112B between the indexes 401 of 30 and 40 that is not present in the second version 113B. In an example embodiment, the first version 113A may be a mature-level version incorporating the additional portion 420, which may be content (e.g., audio and/or video) of a mature nature. Accordingly, the lack of the additional portion 420 in the second version 113B may render the second version 113B more appropriate for a younger audience. In another example embodiment, the additional portion 420 may represent other types of content (e.g., an advertisement) that the viewer wishes to skip.

As a result of the additional portion 420, the time-based indexes 401 of the first version 112B are not each associated with a unique index 401 of the second version 113B. In the example embodiment of FIG. 4B, each of the time-based indexes 401 of 30 to 40 for the first version 112B are associated with a single time-based index 401 of 30 for the second version 113B. Oppositely, the time-based index 401 of 30 for the second version 113B is associated with the single index 401 of 40 of the first version 112B. Consequently, in an example embodiment, correspondence from indexes 401 between one version 112B, 113B and another may only be one-way in nature, as indicated in this case by the unidirectional arrows from the indexes 401 of 30 and 35 of the first version 112B to the index 401 of 30 of the second version 113B. As a result, the timing information of FIG. 4B indicates that a switch from the first version 112B to the second version 113B during the additional portion 420 will result in presenting the second version 113B at the index 401 of 30, thus effectively skipping over any remaining part of the additional portion 420 of the first version 112B. A subsequent switch from the second version 113B back to the first version 112B may then result in a presentation of a corresponding portion of the first version 112B.

While FIGS. 4A and 4B illustrate two different types of possible timing relationships between two versions 112 of the same media content item, other, more complex timing relations between two versions 112 are also possible in other example embodiments. In an example embodiment, such timing relationships may be determined manually, such as by a creator, producer, or distributor of the media content. In another example embodiment, such relationships may be determined automatically by way of analysis of the video streams 402, 412, audio streams 404, 414, and/or the subtitles 406, 416 of the versions 112 for similarities and differences of the content versions 112.

FIG. 5A is a block diagram of a first type of example version metadata 114A employable in the media content source system 110 of FIG. 2. In an example embodiment, for a particular media content item, the version metadata 114A may include a content identifier 502 for the media content item, along with metadata for each version 112 of the media content item. Also in an example embodiment, the version metadata 114A for each version 112 may include a version identifier 510 (e.g., 510A, 510B, and so on), a video stream identifier 512 (e.g., 512A, 512B, and so on), an audio stream identifier 514 (e.g., 514A, 51413, and so on), a subtitles stream identifier 516 (e.g., 516A, 516B, and so on), and the like. In an example embodiment, the media content source system 110 may include one or more of the content identifier 502, the version identifier 510, the video stream identifier 512, the audio stream identifier 514, and the subtitles stream identifier 516 along with the actual video, audio, and subtitles data streams of the version 112 being transmitted to the content access device 102.

The video, audio, and subtitles data streams, in an example embodiment, may be transmitted in an Motion Picture Experts Group (MPEG) transport stream (TS) type of format, which may be suitable for many VOD distribution systems, which may employ Digital Video Broadcast (DVB), Real-Time Streaming Protocol (RTSP), Real-time Transport Protocol (RTP), and so on that may be employed in IPTV systems. Such systems may also include IPTV Quadrature Amplitude Modulation (QAM) VOD systems and IPTV IP VOD systems. In an example MPEG-style embodiment, the content identifier 502 may serve as an MPEG Program ID (PID) in the Program Association Table (PAT). Similarly, some combination of the version identifier 510, the video stream identifier 512, the audio stream identifier 514, and the subtitles stream identifier 516 may be employed as an MPEG Packet ID (PID) in the Program Map Table (PMT) and the various MPEG elementary streams. In addition, the MPEG Program Clock Reference (PCR) provided in the elementary streams may serve as the time-based index 401 of FIGS. 4A and 4B, discussed above.

In an example embodiment, the version metadata 114A may also include version index correlation data 520 that correlates the time-based indexes 401 of the various versions 112, as discussed above in connection with the dashed arrows illustrated in FIGS. 4A and 4B. Also in example embodiments, the version index correlation data 520 may be generated at the media content source system 110 or another system that provides the various versions 112 of the media content item. Such information may be stored in one or more MPEG-type tables associated with the media content item, in an example embodiment.

FIG. 5B is a block diagram of a second type of example version metadata 114B employable in the media content source system 110 of FIG. 2. In this example, the versions 112 of the media content item may be transmitted as a series of individually requested portions or "chunks," such as what may be employed in an HTTP (Hypertext Transfer Protocol) progressive download system, as opposed to an MPEG-style stream. For instance, as shown in FIG. 5B, the version metadata 114B may include a content identifier 501 and a number of content manifests 503 (e.g., 503A, 503B, and so on). Moreover, each manifest 503, in an example embodiment, may include a version address 511, 513, and so on for a chunk of each version 112 of the media content item (e.g., a first version address 511 (511A, 511B, and so on), a second version address 513 (e.g., 513A, 513B, and so on) to facilitate access to the versions 112. In an example embodiment, each version address 511, 513 may be a URL (Uniform Resource Locator) to be used to access the associated chunk. Also included in the version metadata 114B may be version index correlation data 521, similar to the version index correlation data 520 of FIG. 5A, discussed above.

In an example embodiment, each chunk of each version 112 of the media content item may be apportioned such that the chunk of each version 112 spans some predetermined time period, or number of frames, or a number of related frames (e.g., a number of dependent frames and an independent frame upon which the dependent frames rely, such as a GOP), or some other apportionment scheme.

In example embodiments, the media content source system 110 may transmit a manifest 503 for a next chunk to the content access device 102 during or after the transmission of a chunk immediately preceding the next chunk. In some example embodiments, the media content source system 110 may transmit the manifest 503 in response to a TCP (Transfer Control Protocol) file download request. Based on that manifest, the content access device 102 may retrieve the next chunk (e.g., from the media content source system 110) of the same version 112 or another version 112 of the media content item using the address 511, 513, and so on of the desired version 112.

As indicated in the discussion above regarding FIG. 5B, the point in a different version 112 to which the user desires to switch may depend on the current version 112 being presented. Accordingly, the location of the next chunk within a particular version 112 may depend on the identity of the version 112 associated with the previous chunk. As a result, the media content source system 110 or another entity, in some example embodiments, may be configured to generate a next manifest 503 to be transmitted to the content access device 102 based on an identity of the version 112 for which the most recent chunk is or was transferred to that content access device 102.

Figure 6:
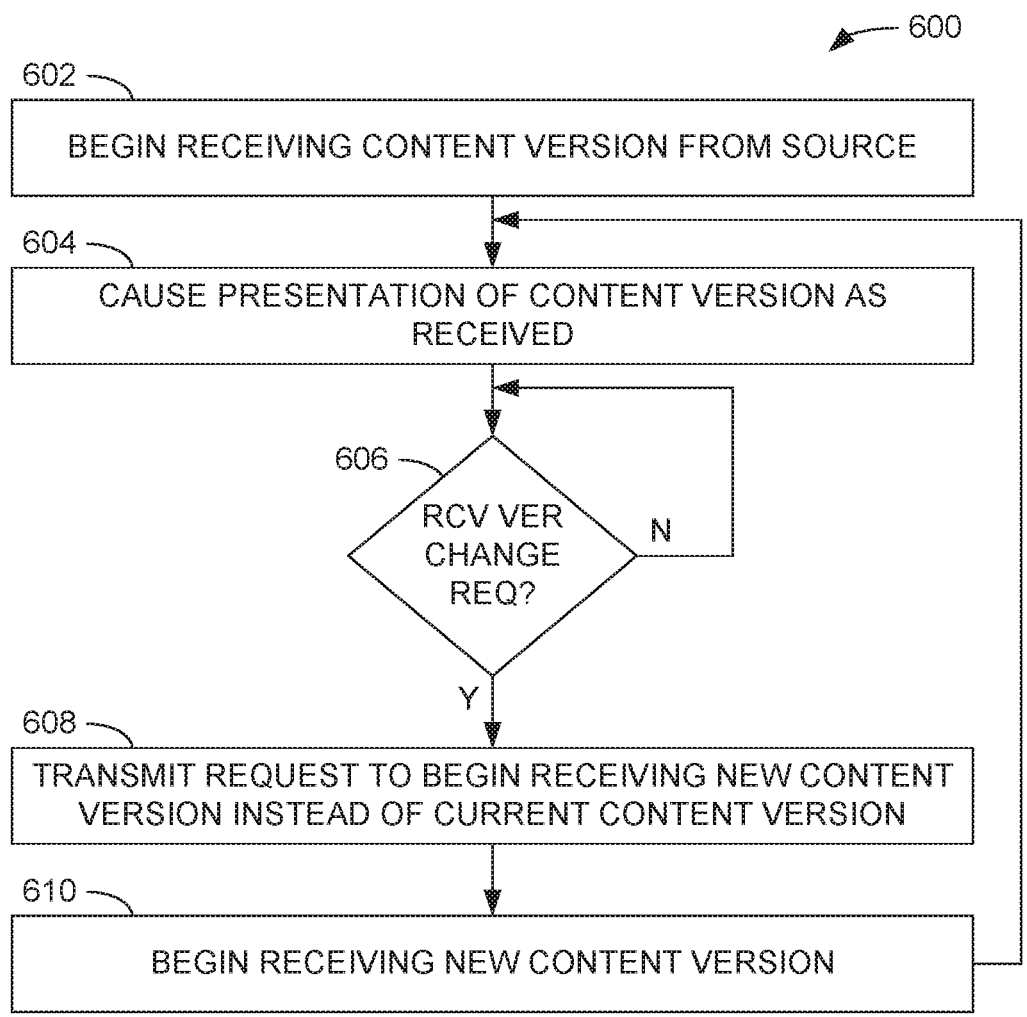
FIG. 6 is a flow diagram of a first example method of operating the content access device of FIG. 3.
Figure 7:
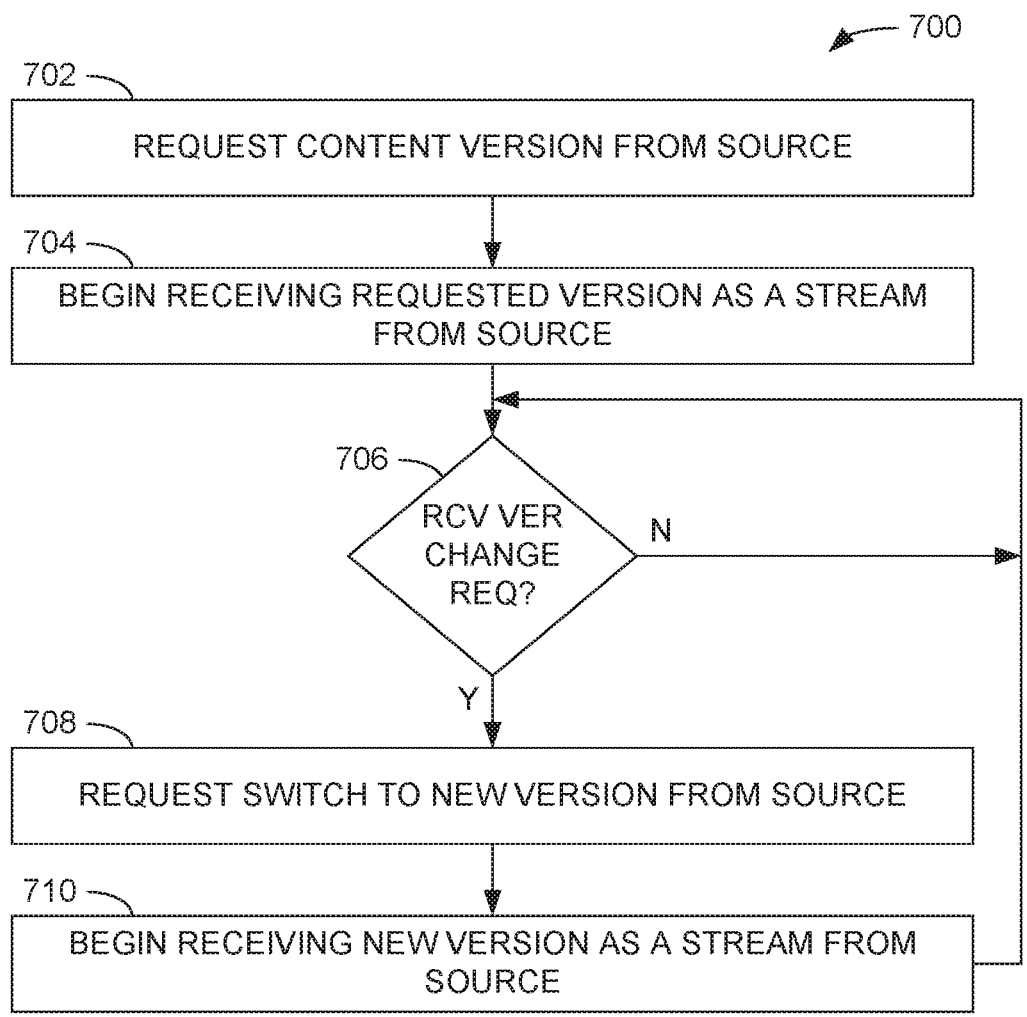
FIG. 7 is a flow diagram of a second example method of operating the content access device of FIG. 3.
Figure 8:
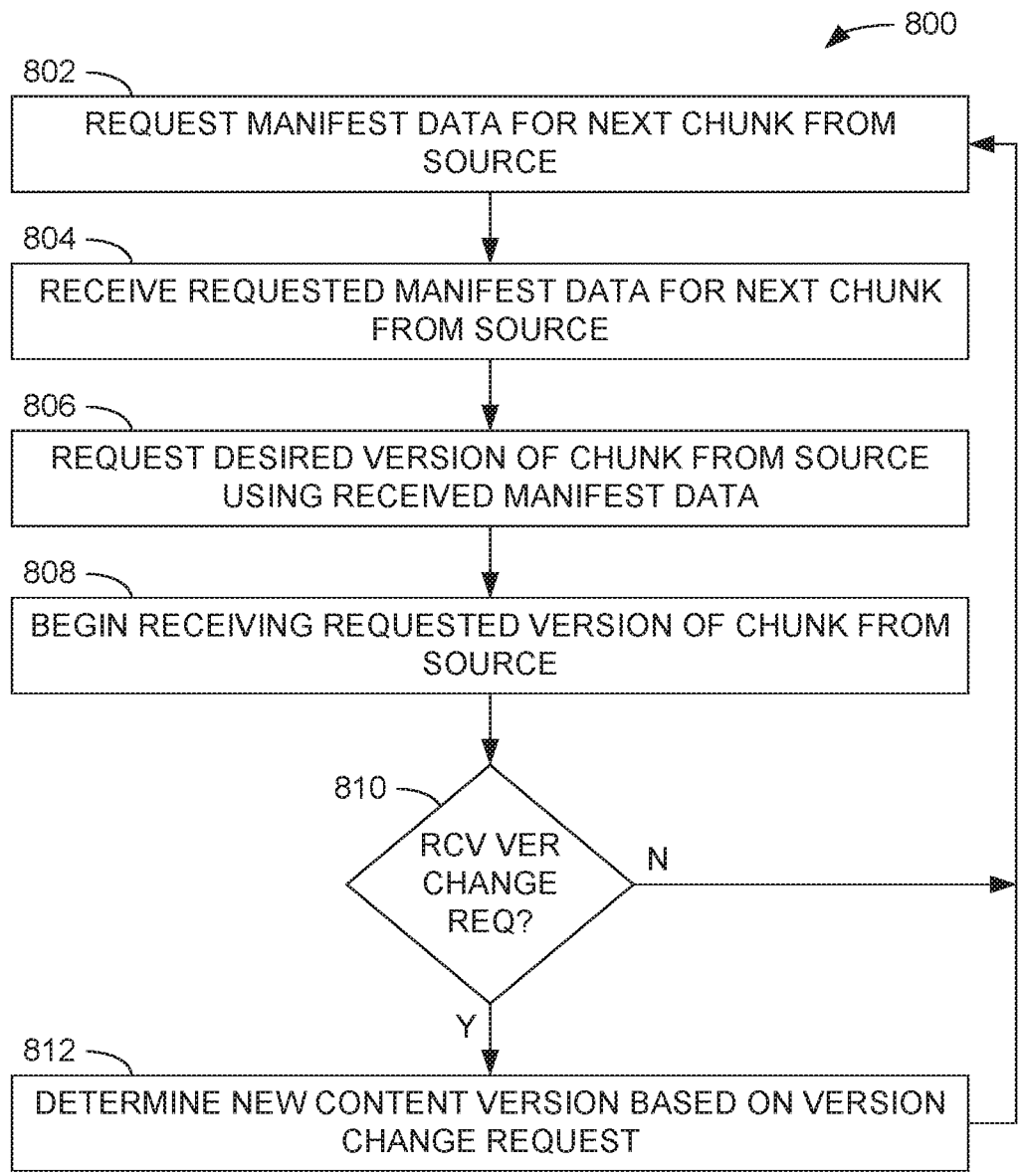
FIG. 8 is a flow diagram of a third example method of operating the content access device of FIG. 3.

FIGS. 6 through 8 are flow diagrams of example methods of operating the content access device 102 of FIGS. 1 and 3, and FIGS. 9 through 11 are flow diagrams of example methods of operating the media content source system 110 of FIGS. 1 and 2. However, while the operations of the methods of FIGS. 6 through 11 discussed below, as well as any other method discussed herein, are described in relation to the content access device 102 and the media content source system 110, other devices or modules not described herein may perform the operations in other example embodiments. Also, while the operations of the methods of FIGS. 6 through 11, as well as those of other methods described herein, are presented in a particular order, other orders of execution are also possible, including simultaneous, concurrent, or overlapping execution of two or more operations.

FIG. 6 is a flow diagram of a first example method 600 of operating the content access device of FIG. 3. In the method 600, the content access device 102 may begin receiving a version 112 of a media content item from the media content source system 110 (operation 602). In an example embodiment, the content access device 102 may initiate the receiving of the version 112 via a request to the media content source system 110 in response to a command (e.g., a selection of a video program from a menu or website, a selection of a particular media content channel, or the like) received via the user interface 304 of the content access device 102. Moreover, in an example embodiment, the selection of the particular version 112 of the selected media content item may be made in response to an explicit indication in the command received via the user interface 304, an indication provided in configuration data 314 of the content access device 102, or a default selection determined at the media content source system 110.

The content access device 102 may then cause presentation of the received version 112 of the media content item as the version 112 is being received (operation 604), such as by way of processing the received version 112 and forwarding the processed version 112 via the display device interface 312 to the display device 104 for presentation to the user.

During the receiving and presenting of the current version 112, the content access device 102 may receive, via the user interface 304 (e.g., via a wireless signal from a remote control device, or via a touchscreen input provided on the content access device 102), a request to switch from the current version 112 to another version 112 of the media content item (operation 606). In response to such a request, the content access device 102 may transmit a request (e.g., via the network interface 302 and the communication network 120) to the media content source system 110 to begin receiving another version 112 of the media content item instead of the version 112 currently being received (operation 608). In an example embodiment, the selection of the particular new version 112 of the media content item in response to the transmitted request may be made in response to an explicit indication in the request received via the user interface 304, an indication provided in configuration data 314 of the content access device 102, or a default selection (e.g., a "family-friendly" version 112) determined at the media content source system 110. After the transmitting of the request, the content access device 102 may then begin receiving the new version 112 of the media content item (operation 610), (e.g., via the network interface 302), which the content access device 102 may then cause to be presented (operation 604) (e.g., via the display device interface 312 and the display device 104). In an example embodiment, each request transmitted from the content access device 102 may result in a toggling between a first version 112 and a second version 112 of the media content item, or transitioning in some order among three or more such versions 112. Also, in some example embodiments, the content access device 102 may also cause presentation (e.g., via the display device 104) of an icon, text, or other indication of the current version 112 (e.g., "safe" or "unsafe") along with the presented version 112.

In another example embodiment associated with FIG. 6, instead of transmitting a request to the media content source system 110 to begin receiving another version 112 of the media content item instead of the version 112 currently being received (operation 608), the content access device 102 may instead cause the switching from one version 112 to another based on version metadata 114 previously received from the media content source system 110. For example, multiple versions 112 of a media content item may be available to the content access device 102 via the network 120, such as by way of broadcast streams, multicast streams, URLs for each chunk of each version 112, and the like. Consequently, in response to receiving a request to change versions 112 (operation 606), the content access device 102 may determine which of the other content versions 112 (e.g., which broadcast stream, multicast stream, URL, and the like) to access, and begin receiving the new content version 112 (operation 610) based on that determination at the appropriate point in the new version 112, as indicated via the version metadata 114 received at, or accessed by, the content access device 102.

FIG. 7 is a flow diagram of a second example method 700 of operating the content access device 102 of FIG. 3. In an example embodiment, the method 700 may be implemented using the version metadata 114A of FIG. 5A with respect to IPTV and similar media content distribution systems. In the method 700, the content access device 102 transmits a request for a media content item version 112 to the media content source system 110 (operation 702) (e.g., via the network interface 302 and the network 120). As in method 600, the content access device 102 may transmit the request in response to a command received via the user interface 304. Additionally, in an example embodiment, the particular version 112 of the selected media content item to be received may be selected in response to an explicit indication in the command received via the user interface 304, an indication provided in the configuration data 314, or a default indication. After the request is transmitted, the content access device 102 may begin receiving (and continue to receive) the requested version 112 as a data stream from the media content source system 110 (operation 704), such as by way of separate video, audio, and/or subtitle streams, as indicated in FIG. 5A. Also in an example embodiment, such streams may be received concurrently, with data packets of each stream being designated by their associated video stream identifier 512, audio stream identifier 514, or subtitles stream identifier 516. The received version 112 may also be processed and provided via the display device interface 312 to the display device 104 for presentation.

In response to a request received via the user interface 304 to switch versions 112. Operation 706), the content access device 102 may transmit a request to the media content source system 110 to switch from the version 112 currently being received and displayed to another version 112 (operation 708). Such a request, in some example embodiments, may include an explicit indication as to which version 112 is to be received. Further, the content access device 102 may select such an explicit indication from portions of the version metadata 114A accompanying the received data streams. After the transmission of the switch request, the content access device 102 may begin receiving the data streams of the new or requested version 112 of media content item (operation 710), and continue to receive, and cause presentation of, the streams in anticipation of receiving another version change request via the user interface 304 (operation 706).

In another example embodiment related to FIG. 7, instead of transmitting a request to the media content source system 110 to request a switch to another version 112 of the media content item (operation 708), the content access device 102 may instead cause the switching from one version 112 to another based on version metadata 114 previously received from the media content source system 110. For example, multiple versions 112 of a media content item may be available to the content access device 102 via the network 120 by way of individual broadcast streams, multicast streams, and so on. Thus, in response to receiving a request to change versions 112 (operation 706), the content access device 102 may determine which of the other content versions 112 (e.g., which broadcast stream or multicast stream) to access, and begin receiving the new content version 112 (operation 710) as a stream (e.g., based on tuning to, or joining, the stream carrying the new version 112) based on that determination at the appropriate point in the new version 112, as indicated via the version metadata 114 received at, or accessed by, the content access device 102.

FIG. 8 is a flow diagram of a third example method 800 of operating the content access device 102 of FIG. 3. In an example embodiment, the method 800 may be implemented using the version metadata 114B of FIG. 5B with respect to OTT and similar media content distribution systems. In the method 800, the content access device 102 may request information (e.g., manifest data) for a first or next chunk of a version 112 of a media content item from the media content source system 110 (operation 802). In an example embodiment, the manifest request may include an indication of the current version 112 being received and/or another version 112 to be received instead of the current version 112. In an example embodiment, the media content source system 110 may know from previous or ongoing communications with the content access device 102 the particular version 112 that the content access device 102 is receiving. After transmitting the manifest request (e.g., as a file request), the content access device 102 may receive the manifest 503 for the next chunk (operation 804). In an example embodiment, the manifest 503 may include an identifier for each version 112 (e.g., via version identifiers), each of which is associated with a version address 511, 513, and so on (FIG. 5B), such as a URL. As indicated above, the version address 511, 513, and so on may depend on the particular version 112 currently being received, and thus may be generated on-the-fly at the media content source system 110 in some example embodiments. In another example embodiment, the content access device 102 may not transmit an explicit request for each manifest 503, as the media content source system 110 may transmit such information presuming that the content access device 102 will utilize that information during or after the transmission of the current chunk.

The content access device 102 may then transmit a request to the media content source system 110 to receive a next chunk of a desired version 112 (operation 806) (e.g., the current version 112 being presented or another version 112 based on a switch request received via the user interface 304 of the content access device 102). In an example embodiment, the request for the next chunk may include an HTTP download request from a URL specified in the received manifest 503 that is associated with the version 112 to be received. After the transmitting of the chunk request, the content access device 102 may receive the requested chunk of the version 112 (operation 808).

During the operations 802-808, the content access device 102 may receive a version change request (operation 810) (e.g., via the user interface 304). In response to the version change request, the content access device 102 may determine the new version 112 to be received (operation 812), which may be based on previous information garnered from one or more manifests 503 previously received from the media content source system 110, and then indicate the new version 112 in the next manifest request (operation 802). In other example embodiments, the content access device 102 may indicate in the manifest request that a version switch is being requested.

In another example embodiment associated with FIG. 8, instead of requesting (operation 802) and receiving (operation 804) the manifest data on a chunk-by-chunk basis, the content access device 102 may receive all of the manifest data (e.g., content manifests 503) for all versions 112 of a particular media content item prior to or during the receiving of the media content item. Consequently, in this example embodiment, the content access device 102 need not request each chunk of the desired version 112 from the media content source system 110, but may instead determine the location (e.g., as indicated by a URL in the manifest data) from which the next chunk of a desired version 112 is to be retrieved based on whether a request to switch versions 112 has been received (operation 810) and the determination of the new content version 112 (operation 812) in view of the received request. The content access device 102 may then request the desired version 112 of the next chunk (operation 806) from the appropriate location and begin receiving the requested version of that chunk (operation 808) for presentation via the display device 104.

Figure 9:
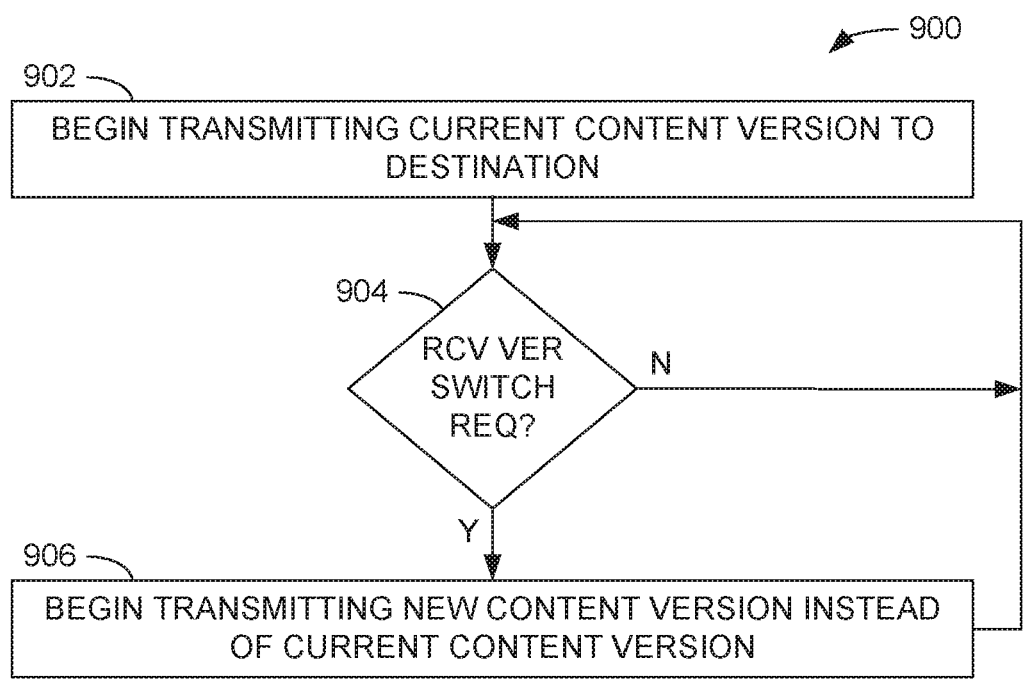
FIG. 9 is a flow diagram of a first example method of operating the media content source of FIG. 2.

FIG. 9 is a flow diagram of a first example method 900 of operating the media content source system 110 of FIG. 2, which may operate in tandem with the method 600 (FIG. 6) of operating the content access device 102. In the method 900, the media content source system 110 may begin transmitting a current version 112 of a media content item to the content access device 102 (operation 902) (e.g., via the network interface 202 and the network 120). In an example embodiment, the media content source system 110 may initiate the transmitting of the version 112 in response to a request from the content access device 102 initiated via a user command (e.g., a selection of a video program from a menu or website, a selection of a particular media content channel, or the like). Moreover, in an example embodiment, the media content source system 110 may select the particular version 112 of the selected media content item based on an explicit indication in the received request, or a default selection indicated at the media content source system 110.

During the transmitting of the current version 112 (operation 902), the media content source system 110 may receive a request to switch to another version 112 of the media content item (operation 904) (e.g., via the network interface 202 and the network 120). In response to such a request, the media content source system 110 may begin transmitting the other version 112 instead of the version 112 currently being transmitted (operation 906). In an example embodiment, the request may explicitly indicate the other version 112 to begin transmitting, or the media content source system 110 may determine the other version 112 based on the number of versions 112 available for the media content item and/or default information available at the media content source system 110. In an example embodiment, the media content source system 110 may respond to subsequent switch requests received from the content access device 102 (operation 904) in a similar manner.

Figure 10:
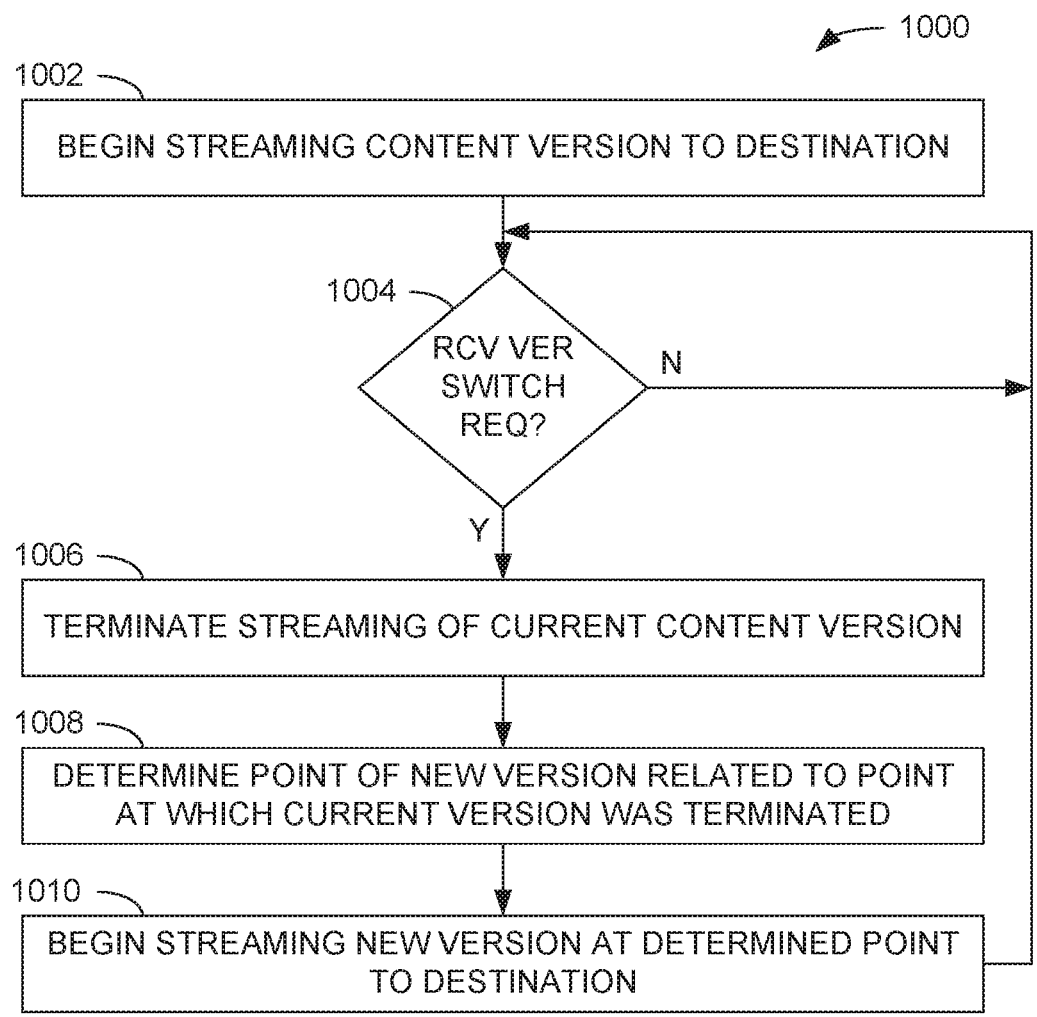
FIG. 10 is a flow diagram of a second example method of operating the media content source of FIG. 2.

FIG. 10 is a flow diagram of a second example method 1000 of operating the media content source system 110 of FIG. 2. In an example embodiment, the method 1000 may operate in conjunction with the method 700 (FIG. 7) of operating the content access device 102 by employing the version metadata 114A of FIG. 5A with respect to IPTV and similar media content distribution systems. In the method 1000, the media content source system 110 may begin transmitting a version 112 of a media content item to the content access device 102 (operation 1002) (e.g., via the network interface 302 and the network 120). As in method 900, the media content source system 110 may initiate the transmitting of the version 112 in response to a request from the content access device 102 initiated via a user command (e.g., a selection of a video program from a menu or website, a selection of a particular media content channel, or the like). After receiving such a request, the media content source system 110 may begin transmitting (and continue to transmit) the requested version 112 as a data stream to the content access device 102 (operation 1002), such as by way of separate video, audio, and/or subtitle streams, as indicated in FIG. 5A. Also in an example embodiment, such streams may be transmitted concurrently, with data packets of each stream being designated by their associated video stream identifier 512, audio stream identifier 514, or subtitles stream identifier 516.

During the transmission of the version 112, the media content source system 110 may receive, from the media content access device 102, a request to switch from the version 112 currently being transmitted to the content access device 102 to another version 112 (operation 1004). Such a request, in some example embodiments, may include an explicit indication as to which version 112 is to be transmitted. Further, the content access device 102 may select such an explicit indication from portions of the version metadata 114A accompanying the received data streams. In other example embodiments, the media content source system 110 may determine which version 112 is to be transmitted, such as in the case of only two versions 112 being available.

In response to receiving the switch request, the media content source system 110 may terminate the transmission of the version 112 currently being transmitted (operation 1006) and determine a point in the newly requested version 112 corresponding to the point in the previous version 112 at which transmission was terminated (operation 1008). In an example embodiment, the media content source system 110 may employ the version index correlation data 520 of the version metadata 114 associated with the media content item, as discussed above. The media content source system 110 may then begin transmitting the data streams of the newly requested version 112 of the media content item (operation 1010) (e.g., via the network interface 202 and the network 120) before awaiting any subsequent version 112 switch requests (operation 1004).

Figure 11:
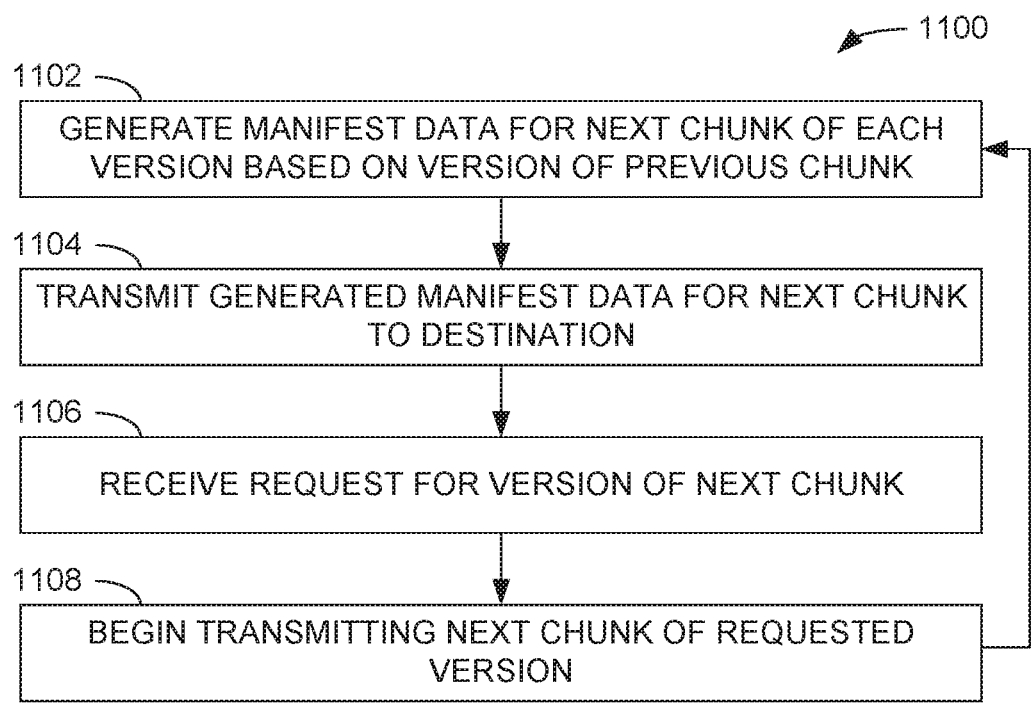
FIG. 11 is a flow diagram of a third example method of operating the media content source of FIG. 2.

FIG. 11 is a flow diagram of a third example method 1100 of operating the media content source system 110 of FIG. 2. In an example embodiment, the method 1100 may be implemented using the version metadata 114B of FIG. 5B with respect to OTT and related media content distribution systems. In the method 1100, the media content source system 110 may generate information (e.g., manifest 503) for a first or next chunk of one or more versions 112 of a media content item to be transmitted to the content access device 102 (operation 1102) and transmit the generated information (e.g., via the network interface 202 and the network 120) to the content access device 102. (operation 1104). In an example embodiment, the media content source system 110 may generate and transmit the manifest data in response to an explicit manifest request (e.g., a file request) from the content access device 102 for that information. Also in an example embodiment, the manifest request may include an indication of the current version 112 being received and/or another version 112 to be received instead of the current version 112. In an example embodiment, the media content source system 110 may be aware, from previous or ongoing communications with the content access device 102, of the particular version 112 that the content access device 102 is receiving. In an example embodiment, the manifest 503 may include an identifier for each version 112 (e.g., via version identifiers), each of which is associated with a version address 511, 513, and so on (FIG. 5B), such as a URL. As indicated above, the version address 511, 513, and so on may depend on the particular version 112 currently being received, and thus may be generated on-the-fly at the media content source system 110 in some example embodiments. In another example embodiment, the content access device 102 may not transmit an explicit request for each manifest 503, as the media content source system 110 may transmit such information presuming that the content access device 102 will utilize that information during or after the transmission of the current chunk.

After transmitting the manifest 503 information, the media content source system 110 may receive, from the content access device 102, a request for the next chunk of a desired version 112 of the media content item (operation 1106) (e.g., the current version 112 being presented or another version 112 based on a switch request received via the user interface 304 of the content access device 102). In an example embodiment, the request for the next chunk may include an HTTP download request from a URL specified in the received manifest 503 that is associated with the version 112 to be received. After the receiving of the chunk request, the media content source system 110 may transmit the next chunk of the requested version 112 to the content access device 102 (operation 1108) (e.g., via the network interface 202 and the network 120).

In other example embodiments, the media content source system 110 may not receive a version switch request from the content access device 102. (e.g., operation 904 of FIG. 9 or operation 1004 of FIG. 10). Consequently, the media content source system 110 may not be directly involved in determining which version 112 is to be streamed or delivered to the content access device 102, or in determining at which point within that version 112 the streaming or delivering is to commence. Instead, the media content source system 110 may simultaneously or concurrently stream or otherwise deliver the various versions 112 of the media content item being received at the content access device 102, and provide the version metadata 114 corresponding to the media content item. The content access device 102 may then retrieve, tune to, or otherwise access the stream of the desired version 112 of the media content item from the media content source system 110 at the appropriate points in the associated versions 112, as described above.

In yet other example embodiments, the media content source system 110 may not generate (operation 1102 of FIG. 11) or transmit (operation 1104 of FIG. 11) manifest data (e.g., content manifests 503) on a chunk-by-chunk basis to the content access device 102). Consequently, as discussed above, the media content source system 110 may provide substantially all of the manifest data for a media content item being retrieved, or to be retrieved, by the content access device 102, thus allowing the content access device 102 to access the particular version 112, chunk-by-chunk, in accordance with the requests for version switching received at the content access device 102.

In at least some of the example embodiments described above, a request received at the content access device 102 to switch to a particular version 112 (e.g., a "child-safe" version 112) of a media content item may not result in switching all, or even any, of the video, audio, and/or subtitles from one version 112 to another. For example, a requested switch to a safe version 112 may result in the original video data 402 and subtitles 406 to be received, and for the audio data 404 of the original version to be replaced by the audio data 414 of a safe version. In yet other example embodiments, in response to a switch request, the content access device 102 may continue to receive the original video data 402, audio data 404, and subtitles 406, but mute the audio data 404 when presented via the display device 104 during an "unsafe" portion of the original version 112 (e.g., additional portion 420), as indicated by the version metadata 114 received at the content access device 102. Such an operational mode may be beneficial in circumstances in which a child is close enough to hear the audible portion, but not see the visual portion, of a media content item being presented.

Figure 12:
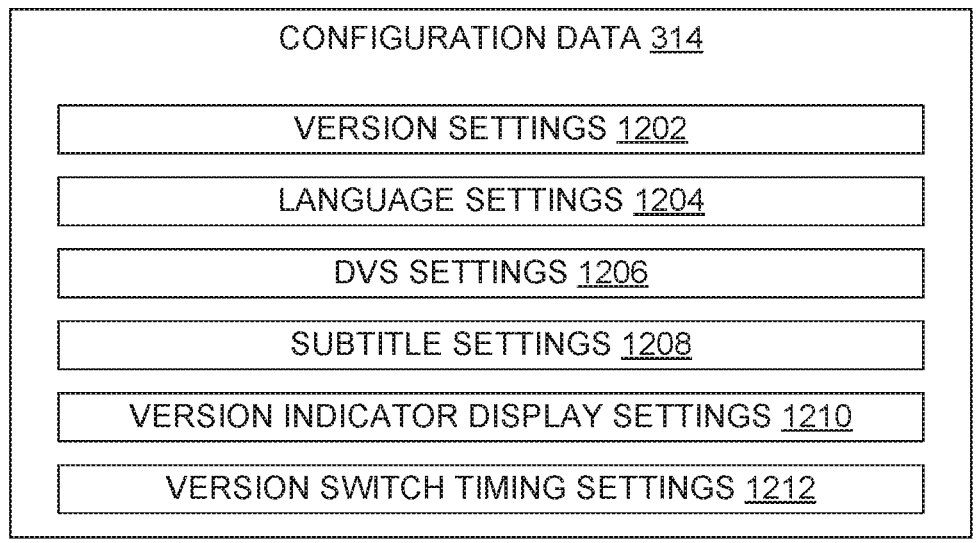
FIG. 12 is a block diagram of example configuration data employable in the content access device of FIG. 3.

FIG. 12 is a block diagram of example configuration data 314 employable in the content access device 102 of FIG. 3. As depicted in the example embodiment of FIG. 12, the configuration data 314 may include version settings 1202, language settings 1204, Descriptive Video Service® (DVS) settings 1206, subtitle settings 1208, version indicator display settings 1210, and version switch timing settings 1212. Other types of configuration data 314 may be employed in other example embodiments.

In an example embodiment, the version settings 1202 may indicate the default versions 112 a user of the content access device 102 desires when beginning to view a media content item. For example, the version settings 1202 may indicate whether the user normally desires viewing original theatrical versions 112 of movies, or abridged versions 112 that omit one or more types of content based on the use of obscene language, violence, and so on. The version settings 1202, in some example embodiments, may indicate whether all "safe" data (e.g., video 412, audio 414, and subtitles 416) is to be presented, whether some original data (e.g., video 402 and subtitles 406) is to be presented along with safe audio data (e.g., audio 414), whether all original data (e.g., video 402, audio 404, and subtitles 406) are to be presented, or some other combination of original and safe data of different versions 112 are to be presented, during safe mode. The language settings 1204, in an example embodiment, may indicate the preferred language in which the user wishes to consume media content, presuming a version 112 of a media content item presents dialogue in such a language. The DVS settings 1206 may indicate whether a user desires a version 112 of a media content item that includes an audio description of visual aspects of the media content item when such a version 112 is available. The subtitle settings 1208, in an example embodiment, may indicate whether a user desires to view a version 112 of a media content item that includes subtitling data, and may include a preference of a particular language for that data, a particular font for that data, a location on the display device 104 where that data may be presented, and so on. In an example embodiment, the version indicator display settings 1210 may specify whether a visual indicator signifying the current version 112 of the media content item being presented is to be displayed via the display device 104 along with the version 112, as well as a location on the screen for the indicator, the size of the indicator, and other aspects regarding the indicator.

In an example embodiment, the version switch timing settings 1212 may include information indicating preferences regarding the timing of presentation of the media content item when a switch in versions 112 of the item is requested. For example, in relation to the example of FIG. 4B, when a user requests a switch from a family-friendly version 112 (e.g., second version 113B) to a more mature version 112 (e.g., first version 112B) of a media content item, the version switch timing settings 1212 may indicate whether the media content source system 110 should begin transmitting the first version 112B at the point therein corresponding to the point in the second version 113B indicated by version index correlation data 520, 521, or should begin transmitting at a point correlating to the beginning of the last additional portion 420 that was partially or completely skipped during the presentation of second version 113B. Other preferences that alter the normal switching between versions 112 (e.g., as indicated in the version index correlation data 520, 521) may be indicated in the version switch timing settings 1212 in other example embodiments.

While certain specific embodiments have been described in depth as they relate to certain types of media content transport systems, such as certain types of IPTV and OTT systems, the various aspects and characteristics discussed herein may be applied to other types of media content transports systems not explicitly discussed herein, including audio-only media content distribution systems.

Figure 13:
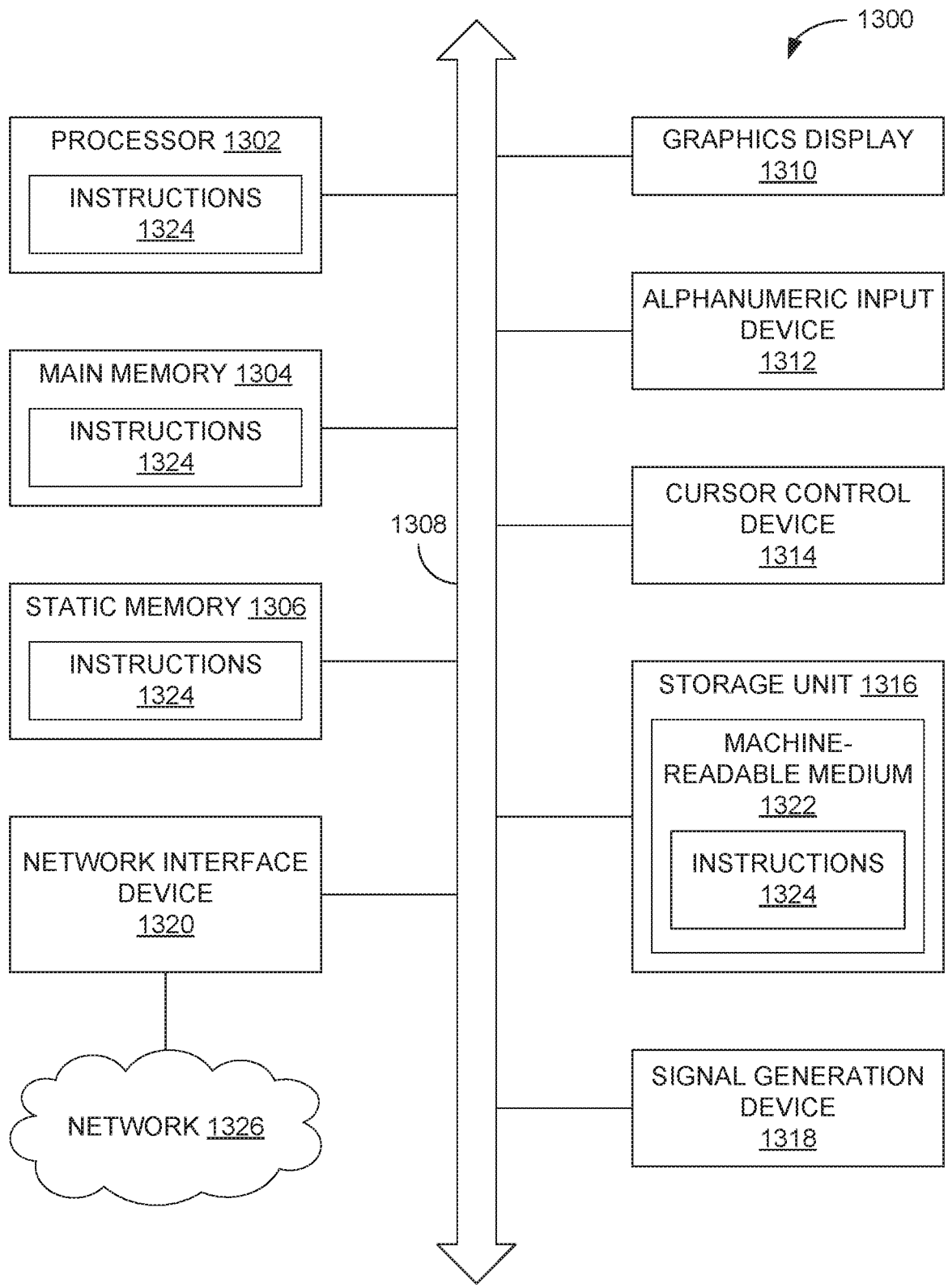
FIG. 13 is a simplified block diagram of a machine in an example form of a computing system within which a set of instructions for causing the machine to perform any one or more of the methodologies discussed herein may be executed.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, or a computer-readable storage medium) and perform any one or more of the methodologies discussed herein, in whole or in part. Specifically, FIG. 13 depicts the machine 1300 in the example form of a computer device (e.g., a computer) within which the instructions 1324 (e.g., software, firmware, a program, an application, an applet, an app, or other executable code) may be executed to cause the machine 1300 to perform any one or more of the methodologies discussed herein, in whole or in part.

For example, the instructions 1324 may cause the machine 1300 to execute the methods 600, 700, 800, 900, 1000, and 1100 of FIGS. 6 through 11, as well as all example embodiments associated therewith. The instructions 1324 can transform the general, non-programmed machine 1300 into a particular machine (e.g., specially configured machine) programmed to carry out the described and illustrated functions in the manner described. Also, in example embodiments, the machine 1300 may operate as one or more of the modules 202-208 of the media content source system 110 of FIG. 2, the modules 302-314 of the content access device 102 of FIG. 3, or any other computing system or device described herein.

In example embodiments, the machine 1300 operates as a standalone device or may be connected (e.g., networked) to other machines. The machine 1300 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 1300 capable of executing the instructions 1324, sequentially or otherwise, that specify actions to be taken by that machine 1300. Further, while only a single machine 1300 is illustrated, the term "machine" shall also be taken to include a collection of machines that individually or jointly execute the instructions 1324 to perform any one or more of the methodologies discussed herein.

The machine 1300 includes a processor 1302 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include a graphics display 1310 (e.g., a plasma display panel (PDP), a light-emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, a signal generation device 1318 (e.g., a sound card, an amplifier, a speaker, a headphone jack, or any suitable combination thereof), and a network interface device 1320.

The storage unit 1316 includes the machine-readable medium 1322 (e.g., a tangible machine-readable storage medium) on which are stored the instructions 1324 embodying any one or more of the methodologies or functions described herein. The instructions 1324 may also reside, completely or at least partially, within the main memory 1304, within the processor 1302 (e.g., within a cache memory of the processor 1302), or both, before or during execution thereof by the machine 1300. Accordingly, the main memory 1304 and the processor 1302 may be considered machine-readable media 1322 (e.g., tangible and non-transitory machine-readable media).

In some example embodiments, the machine 1300 may be a portable or mobile computing device and have one or more additional input components sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1322 able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions 1324. The term "machine-readable medium" shall also be taken to include any medium, or combination of multiple media, that is capable of storing instructions 1324 for execution by a machine (e.g., machine 1300), such that the instructions 1324, when executed by one or more processors of the machine 1300 (e.g., processor 1302), cause the machine 1300 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1322 is non-transitory in that it does not embody a propagating or transitory signal. However, labeling the machine-readable medium 1322 as "non-transitory" should not be construed to mean that the medium is incapable of movement; the medium should be considered as being transportable from one physical location to another in some example embodiments. Additionally, since the machine-readable medium 1322 is tangible, the medium may be considered a machine-readable device.

The instructions 1324 may further be transmitted or received over a communications network 1326 using a transmission medium via the network interface device 1320 and utilizing any one of a number of well-known transfer protocols (e.g., Hypertext Transfer Protocol (HTTP)). Examples of communication networks 1326 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions 1324 for execution by the machine 1300, and includes digital or analog communications signals or other intangible medium to facilitate communication of such software.

In an example embodiment, a computerized method comprises receiving, at a content access device via a communication network from a media content source, a first version of a plurality of versions of a media content item; causing, at the content access device, during the receiving of the first version, presentation of the first version via a display device; receiving, at the content access device, during the receiving of the first version, a first request for a second version of the plurality of versions of the media content item; transmitting, from the content access device via the communication network to the media content source, using at least one hardware processor of the content access device, in response to the first request, a second request to begin receiving the second version instead of the first version; receiving, at the content access device via the communication network from the media content source, after the transmitting of the second request, the second version beginning at a point in the second version related to a point in the first version last received from the media content source; and causing, at the content access device, during the receiving of the second version, presentation of the second version via the display device.

In another example embodiment, including all previous example embodiments, the second request comprises an identifier distinguishing the second version from others of the plurality of versions of the media content item.

In another example embodiment, including all previous example embodiments, the point in the second version comprises a complete content frame.

In another example embodiment, including all previous example embodiments, the point in the first version comprises a first content frame of the first version; and the point in the second version comprises a second content frame of the second version.

In another example embodiment, including all previous example embodiments, the first content frame is associated with a first time-based index of the first version; the second content frame is associated with a second time-based index of the second version; and the second time-based index is related to the first time-based index via information residing at the media content source.

In another example embodiment, including all previous example embodiments, the second content frame is a content frame in the first version immediately following the first content frame.

In another example embodiment, including all previous example embodiments, the first content frame is a content frame within a portion of the first version not appearing in the second version; and the second content frame is a content frame in the first version immediately following the portion of the first version not appearing in the second version.

In another example embodiment, including all previous example embodiments, each of the plurality of versions of the media content item comprises at least one of video data and audio data.

In another example embodiment, including all previous example embodiments, at least one of the plurality of versions of the media content item comprises text data.

In another example embodiment, including all previous example embodiments, the method further comprises at least one of causing, at the content access device, presentation of a visual indicator of the presentation of the first version via the display device during the presentation of the first version; and causing, at the content access device, presentation of a visual indicator of the presentation of the second version via the display device during the presentation of the second version.

In another example embodiment, including all previous example embodiments, the receiving of the second version begins after a termination of the receiving of the first version.

In another example embodiment, including all previous example embodiments, the receiving of the first version comprises receiving a first data stream comprising the first version, the first data stream further comprising information identifying the plurality of versions of the media content item; the second request comprises an identifier for the second version, wherein the information identifying the plurality of versions comprises the identifier for the second version; and the receiving of the second version comprises receiving a second data stream comprising the second version, the second data stream further comprising the information identifying the plurality of versions of the media content item.

In another example embodiment, including all previous example embodiments, the receiving of the first version comprises receiving a plurality of portions of the first version serially; the method further comprises receiving, at the content access device via the communication network from the media content source, in conjunction with each of the plurality of portions of the first version, information identifying an address from which a following portion of each of the plurality of versions of the media content item are receivable; and the second request comprises the address from which the following portion of the second version is receivable.

In another example embodiment, including all previous example embodiments, the information identifying the address from which the following portion of each of the plurality of versions of the media content are receivable is based on an identity of the first version.

In an example embodiment, a computerized method comprises transmitting, from a media content source via a communication network to a content access device, a first version of a plurality of versions of a media content item; receiving, at the media content source via the communication network from the content access device, during the transmitting of the first version, a request for a second version of the plurality of versions of the media content item; and transmitting, from the content access device via the communication network to the media content source, in response to the request, the second version instead of the first version beginning at a point in the second version related to a point in the first version last transmitted to the content access device.

In another example embodiment, including all previous example embodiments, the transmitting of the first version comprises transmitting a first data stream comprising the first version, the first data stream further comprising information identifying the plurality of versions of the media content item; the request comprises an identifier for the second version, wherein the information identifying the plurality of versions comprises the identifier for the second version; and the transmitting of the second version comprises transmitting a second data stream comprising the second version, the second data stream further comprising the information identifying the plurality of versions of the media content item.

In another example embodiment, including all previous example embodiments, the method further comprises terminating, in response to the request, the transmitting of the first version; and determining a point in the second version corresponding to a point in the first version at which the transmitting of the first version is terminated; wherein the transmitting of the second version begins at the determined point in the second version.

In another example embodiment, including all previous example embodiments, the transmitting of the first version comprises transmitting a plurality of portions of the first version serially; the method further comprises transmitting, from the media content source via the communication network to the content access device, in conjunction with each of the plurality of portions of the first version, information identifying an address from which a following portion of each of the plurality of versions of the media content item are receivable; and the request comprises the address from which the following portion of the second version is receivable.

In another example embodiment, including all previous example embodiments, the information identifying the address from which the following portion of each of the plurality of versions of the media content are receivable is based on an identity of the first version.

In an example embodiment, a content access device comprises one or more hardware processors; and a memory storing instructions that, when executed by at least one of the one or more hardware processors, cause the content access device to perform operations comprising receiving, via a communication network from a media content source, a first version of a plurality of versions of a media content item; causing, during the receiving of the first version, presentation of the first version via a display device; receiving, during the receiving of the first version, a first request for a second version of the plurality of versions of the media content item; transmitting, via the communication network to the media content source, in response to the first request, a second request to begin receiving the second version instead of the first version; receiving, via the communication network from the media content source, after the transmitting of the second request, the second version beginning at a point in the second version related to a point in the first version last received from the media content source; and causing, during the receiving of the second version, presentation of the second version via the display device.

In another example embodiment, including all previous example embodiments, the content access device further comprises the display device.

In another example embodiment, including all previous example embodiments, the content access device comprises one of a desktop computer, a laptop computer, a tablet computer, a smart phone, a smart television, a set-top box, a streaming device, and a gaming device.

In another example embodiment, including all previous example embodiments, the first request is received from a remote control device separate from the content access device.

In another example embodiment, including all previous example embodiments, the remote control device comprises one of a tablet computer and a smart phone.

In an example embodiment, a media content source comprises one or more hardware processors; and a memory storing instructions that, when executed by at least one of the one or more hardware processors, cause the media content source to perform operations comprising transmitting, via a communication network to a content access device, a first version of a plurality of versions of a media content item; receiving, via the communication network from the content access device, during the transmitting of the first version, a request for a second version of the plurality of versions of the media content item; and transmitting, via the communication network to the media content source, in response to e request, the second version instead of the first version beginning at a point in the second version related to a point in the first version last transmitted to the content access device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms. Modules may constitute either software modules (e.g., code embodied on a machine-readable medium 1322 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1302 or a group of processors 1302) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method comprising:
   receiving metadata comprising information about a plurality of versions of media content;
   accessing, at a content access device via a communication network from one or more media content sources, a first data stream for a first version of the plurality of versions of media content;
   receiving, at the content access device, during presentation of the first version in the first data stream, a first request for a second version of the plurality of versions of the media content, the second version not including a portion of the media content included in the first version;
   responsive to the first request, accessing, at the content access device via the communication network from the one or more media content sources, using the metadata to identify the second version of the media content, a second data stream for the second version of the media content, the second data stream comprising information identifying the plurality of versions of the media content, the second version in the second data stream having a second segment based on a first segment in the first version of the media content, the second segment being in both the first version and the second version, the first segment not being in the second version in the second data stream; and
   causing, at the content access device, via a display device, presentation of the second version in the second data stream.

2. The computerized method of claim 1, wherein the metadata comprising information about the plurality of versions of media content comprises an identifier for the second version that distinguishes the second version from others of the plurality of versions of the media content.

3. The computerized method of claim 1, wherein the media content comprises a sporting event.

4. The computerized method of claim 1, wherein at least one of the plurality of versions of the media content comprises a subtitle track.

5. The computerized method of claim 1, wherein the first version has a different running time than the second version.

6. The computerized method of claim 1, wherein the first version includes audio in a first language and the second version includes audio in a second language different from the first language.

7. The computerized method of claim 1, wherein:
   the first segment is associated with a first time-based index of the first version;
   the second segment is associated with a second time-based index of the second version; and
   the second time-based index is related to the first time-based index via information residing at a media content source of the one or more media content sources.

8. The computerized method of claim 1, wherein the second segment comprises a content frame in the first version immediately following the portion of the media content not included in the second version.

9. The computerized method of claim 1, wherein the receiving of the second version begins after a termination of the receiving of the first version.

10. The computerized method of claim 1, wherein:
    the receiving of the first version comprises receiving a plurality of portions of the first version serially;
    the method further comprises receiving, at the content access device via the communication network from the one or more media content sources, in conjunction with each of the plurality of portions of the first version, information identifying a different address from which a following portion of the media content are receivable for each of the plurality of versions; and
    the accessing of the second data stream comprises making a second request that comprises the address from which the following portion of the second version is receivable.

11. The computerized method of claim 10, wherein the information identifying the address from which the following portion of each of the plurality of versions of the media content are receivable is based on an identity of the first version.

12. The computerized method of claim 1, wherein the one or more media content sources are a plurality of media content sources and the accessing of the first data stream is from the plurality of media content sources.

13. A system comprising:
a memory that stores instructions; and
one or more hardware processors configured by the instructions to perform operations comprising:
receiving metadata comprising information about a plurality of versions of media content;
accessing, via a communication network from one or more media content sources, a first data stream for a first version of the plurality of versions of media content;
receiving, during presentation of the first version in the first data stream, a first request for a second version of the plurality of versions of the media content, the second version not including a portion of the media content included in the first version;
responsive to the first request, accessing, via the communication network from the one or more media content sources, using the metadata to identify the second version of the media content, a second data stream for the second version of the media content, the second data stream comprising information identifying the plurality of versions of the media content, the second version in the second data stream having a second segment based on a first segment in the first version of the media content, the second segment being in both the first version and the second version, the first segment not being in the second version in the second data stream; and
causing, via a display device, presentation of the second version in the second data stream.

14. The system of claim 13, wherein the metadata comprising information about the plurality of versions of media content comprises an identifier for the second version that distinguishes the second version from others of the plurality of versions of the media content.

15. The system of claim 13, further comprising the display device.

16. A machine-readable medium that stores instructions that, when executed by one or more hardware processors, cause the one or more hardware processors to perform operations comprising:
receiving metadata comprising information about a plurality of versions of media content;
accessing, via a communication network from one or more media content sources, a first data stream for a first version of the plurality of versions of media content;
receiving, during presentation of the first version in the first data stream, a first request for a second version of the plurality of versions of the media content, the second version not including a portion of the media content included in the first version;
responsive to the first request, accessing, via the communication network from the one or more media content sources, using the metadata to identify the second version of the media content, a second data stream for the second version of the media content, the second data stream comprising information identifying the plurality of versions of the media content, the second version in the second data stream having a second segment based on a first segment in the first version of the media content, the second segment being in both the first version and the second version, the first segment not being in the second version in the second data stream; and
causing, via a display device, presentation of the second version in the second data stream.

17. The machine-readable medium of claim 16, wherein the metadata comprising information about the plurality of versions of media content comprises an identifier for the second version that distinguishes the second version from others of the plurality of versions of the media content.

18. The machine-readable medium of claim 16, wherein the media content comprises a sporting event.

19. The machine-readable medium of claim 16, wherein
the receiving of the first version comprises receiving a plurality of portions of the first version serially;
the operations further comprise receiving, via the communication network from the one or more media content sources, in conjunction with each of the plurality of portions of the first version, information identifying a different address from which a following portion of the media content are receivable for each of the plurality of versions; and
the accessing of the second data stream comprises making a second request that comprises the address from which the following portion of the second version is receivable.

20. The machine-readable medium of claim 19, wherein the information identifying the address from which the following portion of each of the plurality of versions of the media content are receivable is based on an identity of the first version.

* * * * *